United States Patent
Fushida et al.

(10) Patent No.: US 7,840,126 B2
(45) Date of Patent: Nov. 23, 2010

(54) VIBRATION DETECTING DEVICE, IMAGING APPARATUS, AND VIBRATION DETECTING METHOD

(75) Inventors: Masahiro Fushida, Kanagawa (JP); Toshifumi Takaoka, Chiba (JP); Hideo Takagi, Tokyo (JP)

(73) Assignee: Sony Corporation, Tokyo (JP)

( * ) Notice: Subject to any disclaimer, the term of this patent is extended or adjusted under 35 U.S.C. 154(b) by 317 days.

(21) Appl. No.: 12/034,363

(22) Filed: Feb. 20, 2008

(65) Prior Publication Data

US 2008/0292297 A1 Nov. 27, 2008

(30) Foreign Application Priority Data

Feb. 21, 2007 (JP) ............................. 2007-041339

(51) Int. Cl.
 *G03B 17/00* (2006.01)
(52) U.S. Cl. ...................................... 396/53; 348/208.2
(58) Field of Classification Search .................. 396/52, 396/53, 55; 348/208.99, 208.1, 208.2, 208.6
 See application file for complete search history.

(56) References Cited

U.S. PATENT DOCUMENTS 5,761,545 A * 6/1998 Tanaka et al. .................. 396/53

2006/0132612 A1 * 6/2006 Kawahara ................ 348/208.6

FOREIGN PATENT DOCUMENTS

JP 4-18515 1/1992
JP 2007-324929 12/2007

* cited by examiner

*Primary Examiner*—Christopher E Mahoney
*Assistant Examiner*—Autumn Parker
(74) *Attorney, Agent, or Firm*—Oblon, Spivak, McClelland, Maier & Neustadt, L.L.P.

(57) ABSTRACT

A vibration detecting device includes: a vibration amount detecting unit including at least a vibration amount sensor which is a portion for detecting a vibration amount, and outputting a vibration detection signal which is a signal indicating the detected vibration amount, and a high-pass filter configured to remove DC components to be superimposed on the vibration detection signal; a status detecting unit configured to detect a particular status which causes a result for providing particular change to the vibration amount detected by said vibration amount sensor; and an input control unit configured to prevent said vibration amount detection signal from being input to said high-pass filter in response to said particular status being detected by said status detecting unit.

14 Claims, 11 Drawing Sheets

MAIN LINE ON

MAIN LINE OFF

THIRD SWITCH BYPASS

FOURTH SWITCH BYPASS

VIBRATION DETECTING DEVICE, IMAGING APPARATUS, AND VIBRATION DETECTING METHOD

CROSS REFERENCES TO RELATED APPLICATIONS

The present invention contains subject matter related to Japanese Patent Application JP 2007-041339 filed in the Japanese Patent Office on Feb. 21, 2007, the entire contents of which are incorporated herein by reference.

BACKGROUND OF THE INVENTION

1. Field of the Invention

The present invention relates to, for example, a vibration detecting device for detecting vibration, an imaging apparatus configured to include the vibration detecting device to realize shaking correction or the like, and a method corresponding to the vibration detecting device.

2. Description of the Related Art

With latest imaging apparatuses such as digital still cameras, video cameras, and so forth, imaging apparatuses including a shaking correction function have been widely known. The shaking correction function is a function for allowing a cameraman to shoot still images or moving images without blurring by eliminating swinging of images due to vibration and swinging of the imaging apparatus which cannot be prevented from occurring, for example, when the cameraman performs handheld shooting or the like.

A configuration for realizing such a shaking correction function, for example, as shown in Japanese Unexamined Patent Application Publication No. 4-18515, has been known, which includes a mechanism capable of driving a correction lens in two directions (pitch direction and yaw direction) which are orthogonal to each other, and perpendicular to an optical axis, and a detection system for detecting angular displacement corresponding to the above-mentioned pitch direction and yaw direction. The mechanism drives the correction lens in the pitch direction and yaw direction based on the angular displacement detected by the detection system, whereby image blurring is suppressed. The information of the angular displacement can be obtained, in principle, by integrating a detection signal obtained by a vibration sensor for detecting angular acceleration or angular velocity. Also, the vibration sensor can be realized with an acceleration or velocity detection sensor other than an angular-acceleration sensor.

Note however, in practical use, it has been known that DC components called drift of which the potential fluctuates over a very long cycle due to temperature, time course or the like are superimposed on the detection signal of an angular-acceleration meter or an angular-velocity meter serving as the above-mentioned vibration sensor. Therefore, in order to realize a system for detecting angular displacement, a high-pass filter for removing the above-mentioned drift has been provided.

SUMMARY OF THE INVENTION

Incidentally, the frequency of shaking is usually around 12 Hz through 1 Hz, which is fairly low, so the cut-off frequency of the above-mentioned high-pass filter needs to be set so as to cut DC components while securing the passage of the frequency components equivalent to this shaking. Accordingly, it is common to set the cut-off frequency of the high-pass filter in practical use to around 0.1 Hz or less.

Note however, as described above, a very low cut-off frequency (time constant) is set regarding the high-pass filter, so it has been known that following an operation for greatly change the shooting direction, which is panning, tilting, or the like, being performed for example, appropriate shaking correction effects cannot be obtained in some cases.

That is to say, in the case of an operation such as panning or tilting or the like, markedly greater angular displacement than that in a state of normal shaking is detected, and consequently, an excessive signal corresponding thereto is input to the high-pass filter. The DC components corresponding to the signal thus input are superimposed on the output of the high-pass filter, but the duration necessary for removing the DC components is time indicated with the inverse number of the cut-off frequency of the high-pass filter. For example, if the cut-off frequency is 0.1 Hz, the duration thereof is 10 seconds.

This means that upon an operation such as panning or tilting being performed once, the DC components at the output of the high-pass filter remain for a while. That is to say, even upon completing an operation such as panning or tilting, fixing the shooting direction in a usual handheld manner (even if a user intends to fix the shooting direction, handheld shooting causes swing, i.e., shaking) to make the transition to a state in which shooting can be performed, the detection signal which can be obtained is a detection signal on which the above-mentioned DC components are superimposed as to the value of true angular displacement corresponding to the shaking at this time.

Thus, following panning or tilting, the detection signal becomes a detection signal on which DC components are superimposed as to true angular displacement corresponding to shaking, and consequently, the following property of shaking correction control is deteriorated. For example, the detection of shaking has no relation with actual shaking in a phenomenon such as a shooting image moving slowly in a certain direction according to the correction lens moving slowly corresponding to the above-mentioned DC components as an example, and accordingly, the behavior of unsuitable shaking correction which the user does not expect is caused in some cases.

Thus, with the current shaking correction function, a shortcoming due to residual DC components when an excessive signal is input to the high-pass filter causes a problem, and demand for realizing an effective solution as to this point has increased. There has been recognized the need for a vibration detecting device which addresses these issues.

According to an embodiment of the present invention, a vibration detecting device includes: a vibration amount detecting unit including at least a vibration amount sensor which is a portion for detecting a vibration amount, and outputting a vibration detection signal which is a signal indicating the detected vibration amount, and a high-pass filter configured to remove DC components to be superimposed on the vibration detection signal; a status detecting unit configured to detect a particular status which causes a result for providing particular change to the vibration amount detected by the vibration amount sensor; and an input control unit configured to prevent the vibration amount detection signal from being input to the high-pass filter in response to the particular status being detected by the status detecting unit.

Also, according to an embodiment of the present invention, an imaging apparatus includes: an imaging unit configured to perform imaging; a vibration amount detecting unit including at least a vibration amount sensor which is a portion for detecting a vibration amount, and outputting a vibration detection signal which is a signal indicating the detected vibration amount, and a high-pass filter configured to remove DC components to be superimposed on the vibration detection signal; a shaking correction control unit configured to execute shaking correction control using the signal output from the vibration amount detecting unit; a status detecting unit configured to detect a particular status which causes a result for providing particular change to the vibration amount detected by the vibration amount sensor; and an input control unit configured to prevent the vibration amount detection signal from being input to the high-pass filter in response to the particular status being detected by the status detecting unit.

With the above-mentioned arrangements, with regard to the vibration amount detection signal obtained by detecting a vibration amount, DC components to be superimposed on the vibration amount detection signal is removed with the high-pass filter. The DC components to be removed with the high-pass filter are caused due to a physical configuration for detecting a vibration amount for example.

Thereupon, with embodiments of the present invention as described in the present specification, in the case of detecting a particular status which causes a result for providing particular change to the vibration amount detected by the vibration amount sensor, the high-pass filter is controlled so as not to input the vibration amount detection signal.

Here, for example, as the above-mentioned particular status, when handling a case such that the vibration amount to be detected by the vibration amount sensor increases greater than a predetermined amount, the high-pass filter is controlled so as not to input the vibration amount detection signal indicating this vibration amount greater than the predetermined amount, and consequently, excessive DC components are prevented from being superimposed on the output of the high-pass filter.

Subsequently, predetermined control including shaking correction and so forth is performed based on the signal obtained by the vibration detecting unit of the vibration detecting device (imaging apparatus) according to the present application, whereby a control operation from which the influence of the above-mentioned DC components is eliminated can be obtained. That is to say, even with the vibration detection system including the high-pass filter, a suitable control result can be expected constantly regardless of the occurrence of an excessive vibration detection signal.

DESCRIPTION OF THE PREFERRED EMBODIMENTS

As for the preferred modes (hereafter, referred to as embodiments) for carrying out the invention in the present specification, an imaging apparatus called a digital still camera will be given as an example. The primary function as such a digital still camera is to shoot a still image, as a photograph or the like, and store this in a medium as a still image file. Note however, in recent years, digital still cameras including moving image shooting functions have become widespread. According to moving image shooting, information as a moving image obtained with imaging can be recorded in a medium with a predetermined moving image file format. An imaging apparatus 1 according to the present embodiment is also configured so as to include such a moving image shooting function.

Figure 1:
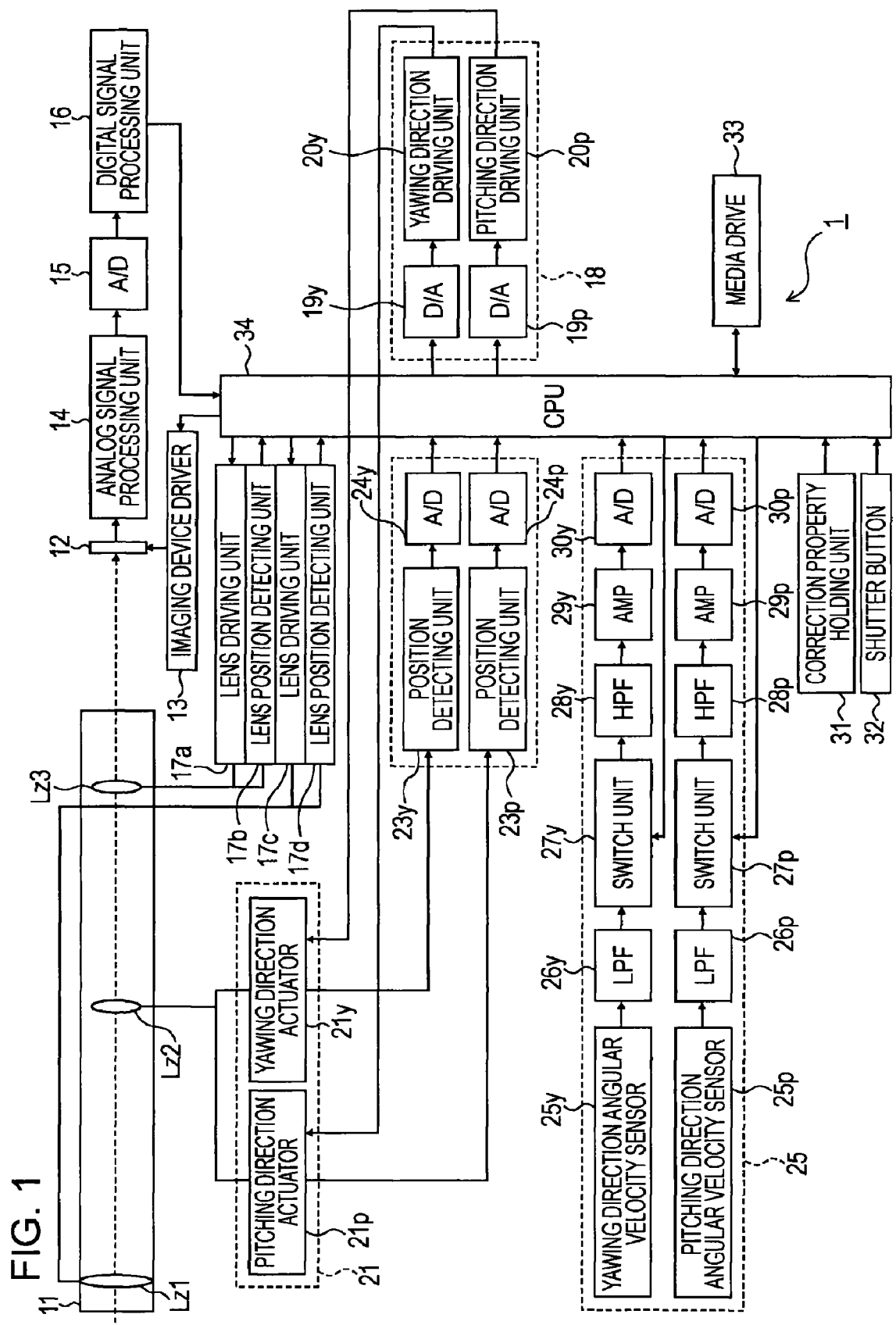
FIG. 1 is a block diagram illustrating a configuration example of an imaging apparatus according to an embodiment of the present invention.

The block diagram in FIG. 1 illustrates a configuration example of the imaging apparatus 1 serving as the present embodiment. First, an optical system unit 11 is made up of a necessary number of lenses (lens group), which combines incident light on the light-receiving surface of an imaging device 12 as imaging light. In this case, as a lens group making up the optical system unit 11, a zoom lens group $Lz1$, an optical axis correction lens group $Lz2$, and a focus lens group $Lz3$ are illustrated. Note that the functions regarding these lens groups, and the driving control thereof and the like will be described later.

The imaging device (solid-state imaging device) 12 subjects imaging light thus received to photoelectric conversion, an imaging device driver 13 sequentially outputs signal charges accumulated according to the received light of imaging light at the light-receiving surface in accordance with a timing signal generated and output under the control of a CPU 34, thereby outputting an electric signal corresponding to imaging light.

Note that as for the imaging device 12, a CCD (Charge Coupled Device) or a CMOS sensor or the like can be given at the present, but which should not be restricted particularly.

An analog signal processing unit 14 inputs, for example, the signal output from the imaging device 12, subjects this to CDS (Correlated Double Sampling) processing, AGC (Automatic Gain Control) processing, or the like for example, and outputs this to an A/D converter 15. The A/D converter 15 converts the input signal into a digital signal, and outputs this to a digital signal processing unit 16.

The digital signal processing unit 16 generates digital image data in a format corresponding to a moving image or still image from the input digital signal as necessary. Also, this digital image data can be subjected to camera signal processing, such as AE (Auto Exposure), AWB (Auto White Balance), or the like.

The digital image data thus obtained is, for example, subjected to compression encoding using a predetermined compression system, and further subjected to recording encoding, following which is transferred to a media drive 33 under the control of the CPU 34, whereby the data can be recorded in a medium (recording medium) inserted or built in the media drive 33 so as to be managed as a file for example.

For example, in order to record and save digital image data in a medium as a still image (photo), the user is allowed to operate a shutter button 32. For example, with the shutter button 32, the user can perform an operation for pressing lightly (shallowly), which is called half-pressing, and an operation for pressing stronger (deeper) than half-pressing which is called full-pressing. Subsequently, a signal indicating which state the current operation state is of a released state wherein no operation is performed, the above-mentioned half-pressed state, or the above-mentioned full-pressed state is output from the shutter button 32 to the CPU 34, and the CPU 34 can recognize the state of the shutter button 32 based on this signal.

For example, upon recognizing that the shutter button 32 is in a half-pressed state, the CPU 34 executes focus control so as to be focused on a predetermined position in an imaging image. Also, upon recognizing that a full-pressing operation is performed, control is executed so as to record digital image data which is a still image corresponding to the imaging image obtained at that time in a medium.

Also, at the time of a moving image shooting mode, for example, full-pressing of the shutter button 32 is an operation for instructing start of shooting recording.

Also, a correction property holding unit 31 is, for example, physically, a nonvolatile storage region such as flash memory or the like, here property (correction property, parameters) information necessary for shaking correction is written and held.

Next, description will be made regarding the zoom lens group Lz1, focus lens group Lz3, and optical axis correction lens group Lz2 which have been shown previously assuming that those lens groups are provided with the optical system unit 11.

First, the zoom lens group Lz1 is made up of a necessary number of lenses for zoom adjustment (field angle) and is provided so as to be moved in the lens optical axis direction. The position in the optical axis direction of the zoom lens group Lz1 is controlled so as to be moved by a driving mechanism unit which is a lens driving unit 17c in accordance with the control of the CPU 34. Thus, the zoom lens group Lz1 is controlled to be moved, whereby a necessary zoom magnifying power (field angle) can be obtained. Also, the position in the optical axis direction of the zoom lens group Lz1 is detected by a zoom lens position detection unit 17d. The CPU 34 is configured so as to recognize the position of the zoom lens group Lz1 by acquiring the detection signal of the zoom lens position detection unit 17d. The CPU 34 determines the movement control amount of the zoom lens group Lz1 based on the recognized position of the zoom lens group Lz1 and the necessary zoom magnifying power.

The focus lens group Lz3 is made up of a necessary number of lenses for focus control, and is provided so as to be moved in the lens optical axis direction. The position in the optical axis direction of the focus lens group Lz3 is controlled so as to be moved by a driving mechanism unit which is a lens driving unit 17a in accordance with the control of the CPU 34. According to this movement control, the focus state of imaging light to be entered the optical system unit 11 and combined at the imaging device 12 is adjusted, whereby a suitable focus state regarding a subject can be obtained.

Also, the position in the optical axis direction of the focus lens group Lz3 is detected by a focus lens position detection unit 17b. The CPU 34 determines the movement control amount of the focus lens group Lz3 depending on the position of the focus lens group Lz3 recognized by the detection signal acquired from the focus lens position detection unit 17b, and the necessary focus state.

The optical axis correction lens group Lz2 in this case is made up of a necessary number of lenses for so-called shaking correction, and is provided so as to be moved with two axes (X axis and Y axis) as rotational axes, which are perpendicular to the lens optical axis Z, and are orthogonal to each other. Here, a movable direction corresponding to X axis will also be referred to as a pitching direction, and a movable direction corresponding to Y axis will also be referred to as a yawing direction.

The driving in the pitching direction and the driving in the yawing direction of the optical axis correction lens group Lz2 is performed by a driving mechanism unit which is a shaking correction actuator unit 21. The shaking correction actuator unit 21 includes a pitching direction actuator 21p and a yawing direction actuator 21y as shown in the drawing. The driving of the optical axis correction lens group Lz2 in the pitching direction is performed by the pitching direction actuator 21p, and the driving of the optical axis correction lens group Lz2 in the yawing direction is performed by the yawing direction actuator 21y.

The position in the pitching direction and the position in the yawing direction of the optical axis correction lens group Lz2 are each detected by the shaking correction position-detection unit 22, and is output to the CPU 34. The shaking correction position-detection unit 22 is made up of a position detecting unit 23p for detecting the position in the pitching direction, an A/D converter 24p system, a position detecting unit 23y for detecting the position in the yawing direction, and an A/D converter 24y system.

The position detecting unit 23p is formed by employing a hall device or the like for example, and directly detecting the physical sate of the pitching direction actuator 21p to detect the position of the optical axis correction lens group Lz2 in the pitching direction. The detection signal of the position detecting unit 23p is converted into a digital signal by the A/D converter 24p to be input to the CPU 34.

Similarly, the position detecting unit 23y detects the position in the yawing direction of the optical axis correction lens group Lz2, and converts the detection signal thereof into a digital signal by the A/D converter 24y to output this to the CPU 34.

The CPU 34 can recognize the position state (attitude) in the pitching direction and in the yawing direction of the optical axis correction lens group Lz2 by acquiring the detection signal thus output from the shaking correction position-detection unit 22. Also, the driving of the shaking correction actuator unit 21 is performed by the shaking correction actuator driving unit 18 in accordance with the control of the CPU 34.

The CPU 34 outputs the movement control amount in the two-axes directions of the optical axis correction lens group Lz2 for the sake of shaking correction to the shaking correction actuator driving unit 18 based on the components of the respective vibration amounts in the pitching direction and in the yawing direction (two-axes directions) obtained from the detection signal of the angular velocity acquired from the shaking detection unit 25, and the positional state of the optical axis correction lens group Lz2 recognized from the detection signal acquired from the shaking correction position-detection unit 22.

The shaking correction actuator driving unit 18 converts the signal of the movement control amount in the pitching direction output from the CPU 34 into an analog amount by a D/A converter 19p to input this to the pitching direction driving unit 20p. The pitching direction driving unit 20p drives the pitching direction actuator 21p in the shaking correction actuator unit 21 in accordance with the input movement control amount. Similarly, the signal of the movement control amount in the yawing direction output from the CPU 34 is converted into an analog amount by a D/A converter 19y of the shaking correction actuator driving unit 18 to be input to the yawing direction driving unit 20y. The yawing direction driving unit 20y drives the yawing direction actuator 21y in the shaking correction actuator unit 21 in accordance with the input movement control amount.

As described above, in order to perform shaking correction control, the information of the movement control amount corresponding to the yawing direction and the movement control amount corresponding to the pitching direction is provided to the shaking correction actuator 18 to drive the optical axis correction lens group Lz2, but the above-mentioned movement control amount is obtained first by the shaking detection unit 25 acquiring the information of the angular velocity in the yawing direction and the angular velocity in the pitching direction corresponding to the movement provided to the imaging apparatus 1, and then by the CPU 34 acquiring the information of such angular velocity to perform predetermined computation or the like.

Therefore, subsequently, description will be made regarding the configuration of a control processing system since angular velocity is detected by the shaking detection unit 25 until the movement control amount is obtained and output by the CPU 34.

First, description will be made regarding the configuration of the shaking detection unit 25 with reference to the same FIG. 1. As shown in the drawing, the shaking detection unit 25 is made up of a yawing direction detecting system for detecting the components of the vibration amount in the yawing direction, and a pitching direction detecting system for detecting the components of the vibration amount in the pitching direction.

First, the yawing direction detecting system is provided with a yawing direction angular velocity sensor 25y which is an angular velocity sensor provided so as to detect angular velocity corresponding to the vibration and movement in the yawing (Y axis) direction. The yawing direction angular velocity sensor 25y outputs a detection signal indicating an angular velocity value that is represented with a negative or positive value depending on the components of the movement in the yawing direction, for example, with the output in a state in which the imaging apparatus 1 rests as reference.

As an example, the angular velocity sensor employed for the yawing direction angular velocity sensor 25y is made up of a vibrator employing piezoelectric ceramic such as titanic-acid lead zirconate (PZT) or liquid crystal, and a vibration gyroscope or the like employing Corio Rika so as to detect angular velocity. This angular velocity sensor is configured to output, for example, voltage of 1.4 V as a reference value in a state in which angular velocity is not provided, output a voltage value higher than the reference value in accordance with rotational velocity being provided in one certain direction (positive direction) to perform rotation, and output a voltage value lower than the reference value in accordance with rotational velocity being provided in the other direction (negative direction) to perform rotation.

Note that the angular velocity thus detected by the yawing direction angular velocity sensor 25y is obtained according to the vibration and movement in the yawing direction, so can be regarded as the vibration amount in the yawing direction being shown numerically.

The detection signal output from the yawing direction angular velocity sensor 25y without change includes components which are handled as an unnecessary band, for example, such as the resonance frequency components, noise, and the like of the angular velocity sensor, as to frequency band components of signals indicating angular velocity values. Therefore, the detection signal output from the yawing direction angular velocity sensor 25y is passed through an LPF (Low Pass Filter) 26y, whereby the above-mentioned unnecessary band components are removed. In this case, the detection signal passed through the LPF (Low Pass Filter) 26y is illustrated to pass through a switch unit 27y.

The switch unit 27y is actually made up of first through fourth switches 27A through 27D to be inserted as described later with reference to FIG. 3, which are turned on/off by the CPU 34. Depending on a combination of on/off of these switches, the signal route is changed such that the detection signal passed through the LPF 26y skips an HPF at the subsequent stage to be input to an amplifier 29y in some cases.

According to the above-mentioned LPF 26y, unnecessary signal components of which the frequency bands are higher than that in the signal component of the angular velocity value included in the detection signal are removed. Note however, DC components called drift or the like which fluctuate for a long period from several ten seconds to several minutes due to temperature and the like are superimposed on the detection signal. It is difficult to recognize the true absolute value of the angular velocity as long as this drift is superimposed on the detection signal. Note that the drift as stated here also includes DC components which fluctuate in accordance with not only temperature but also time course on the conditions of constant temperature.

Therefore, the above-mentioned DC components are removed by passing the detection signal through the HPF 28y. Here, the frequency of vibration to be caused by normal shaking is around 12 Hz through 1 Hz, so at the HPF 28y, it is necessary to set the cut-off frequency so as to pass the detection signal through the frequency band of the vibration corresponding to this shaking to remove the DC components. Specifically, for example, the cut-off frequency of around 0.1 Hz is set. The signal passed through the HPF 28y is input to the amplifier 29y.

The amplifier 29y amplifies the input detection signal. At this amplifier 29y, in order to obtain high control precision, a fairly high amplification factor is set. The detection signal amplified by the amplifier 29y is converted into a digital signal by an A/D converter 30y and output to the CPU 34.

Also, the pitching direction detecting system in the shaking detection unit 25 includes a pitching direction angular velocity sensor 25p instead of the yawing direction angular velocity sensor 25y in the above-mentioned yawing direction detecting system. The device serving as the pitching direction angular velocity sensor 25p may be, for example, the same as the yawing direction angular velocity sensor 25y, but is provided so as to detect the angular velocity (vibration amount) corresponding to the movement components in the pitching direction (X axis direction).

The portions at later stages than the pitching direction angular velocity sensor 25p include, according to the same configuration as the above-mentioned yawing direction angular velocity sensor 25y, an LPF 26p, a switch unit 27p, an HPF 28p, an amplifier 29p, and an A/D converter 30p.

The CPU 34 acquires the digital angular velocity detection signal corresponding to the pitching direction and the digital angular velocity detection signal corresponding to the yawing direction from the respective A/D converters 30p and 30y.

Figure 2:
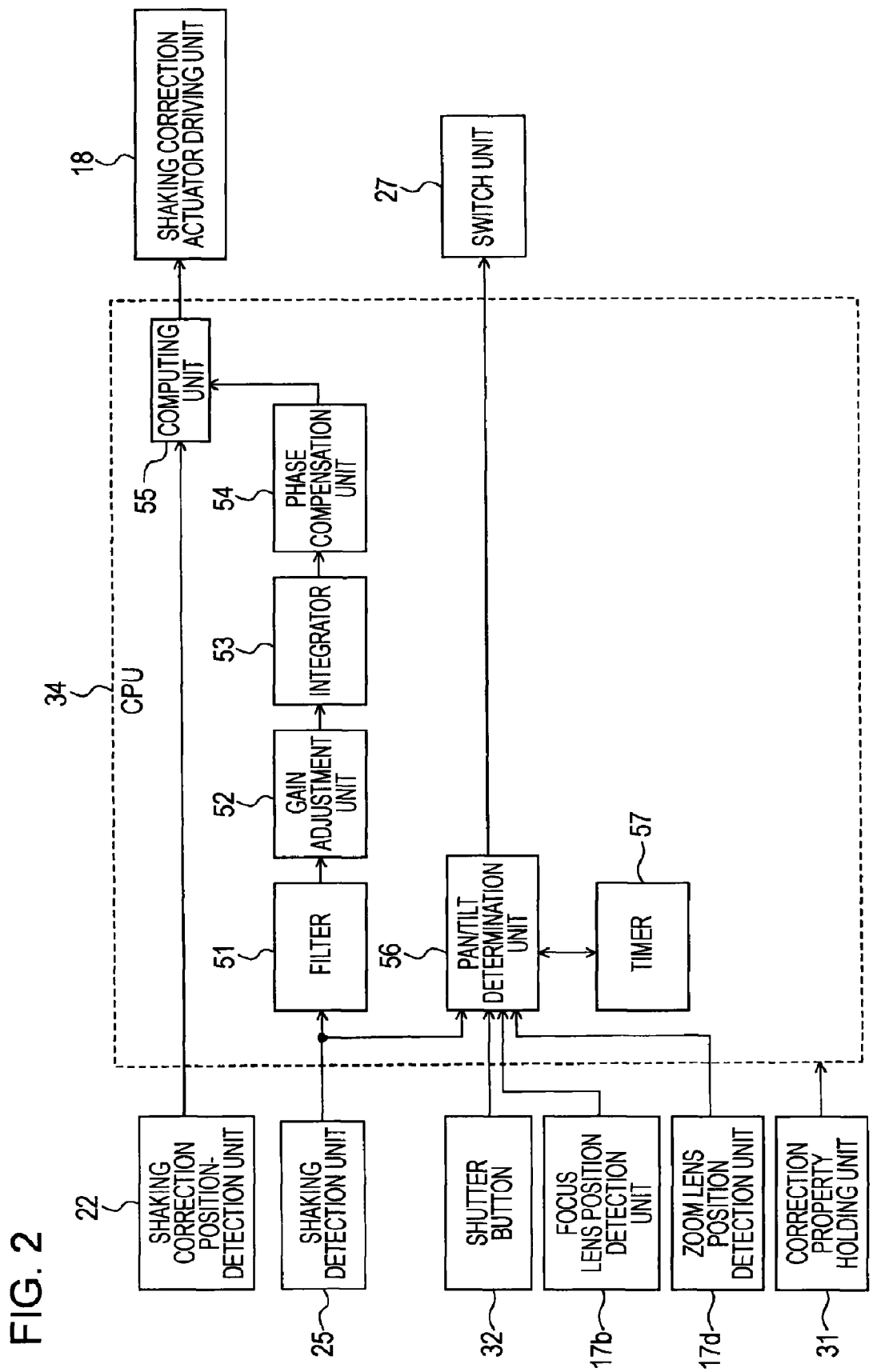
FIG. 2 is a block diagram illustrating functions relating to shaking correction which a CPU of the imaging apparatus according to the embodiment executes.

FIG. 2 is a diagram blocking and schematically illustrating functions which the CPU 34 executes regarding shaking correction control according to the present embodiment along with portions relating to the surrounding portions. Note that the functions of the blocks within the CPU 34 illustrated in this drawing are realized by the CPU 34 executing the program.

Description will be made regarding the configuration of the CPU 34 for obtaining the movement control amount from the angular velocity detection signal output from the above-mentioned shaking detection unit 25 with reference to this drawing. In this drawing, a system corresponding to obtaining the movement control amount is made up of the portions of a filter 51, a gain adjustment unit 52, an integrator 53, a phase compensation unit 54, and a computing unit 55.

Note that in practical use, the system made up of the respective portions for obtaining the movement control amount is provided so as to correspond to the yawing direction and the pitching direction, i.e., the two systems are provided, but on the convenience which simplifies the drawing, in FIG. 2, only the system corresponding to any one of the yawing direction and the pitching direction is illustrated based on the these two systems having the same configuration.

As described above, the digital angular velocity detection signal output from the shaking detection unit 25 is input to the filter 51 within the CPU 34, for example, the frequency components corresponding to noise are removed, and then predetermined gain is provided by the gain adjustment unit 52, following which the angular velocity detection signal is input to the integrator 53.

With the integrator 53, the angular velocity detection signal is input, and integration is performed regarding this, i.e., integration regarding the values indicating angular velocity (angular velocity value) is performed. Thus, the output signal of the integrator 53 becomes a signal indicating the angle value (movement angle value) moved in the yawing direction (or tilting direction). The signal of the movement angle value is input to the phase compensation unit 54, where phase compensation is performed, and input to the computing unit 55. The angle indicated with the output of the phase compensation unit 54 becomes a target angle where the optical axis correction lens group L2 should be positioned for correcting the movement of an image due to shaking.

At the computing unit 55, a predetermined calculation is performed using the detection signal output from the shaking correction position-detection unit 22 indicating the position (i.e., the position of the yawing direction (or pitching direction) of the optical axis correction lens group Lz2 of the current yawing direction actuator 21y (or pitching direction actuator 21p), the signal of the movement angle value output from the above-mentioned phase compensation unit 54, thereby calculating the angle amount (movement control amount) which the optical axis correction lens group Lz2 should be moved in order to actually position the optical axis correction lens group Lz2 at the target angle. The computing unit 55 outputs the value of the calculated movement control amount to the shaking correction actuator driving unit 18. Based on the movement control amount thus input, as described above, the shaking correction actuator driving unit 18 drives the shaking correction actuator 21 (yawing direction actuator 21y, pitching direction actuator 21p), whereby the optical axis correction lens group Lz2 is controlled to be moved by the angle worth corresponding to the movement control amount. As a result of this, an operation can be obtained wherein the optical axis in the optical system varies such that the image blurring caused due to shaking is returned to the original position. That is to say, shaking correction control is executed.

Incidentally, in the case of detecting angular velocity (vibration amount) using an angular velocity sensor (or angular acceleration sensor), in order to obtain a true angular velocity value, there is a need to provide an HPF of which the cut-off frequency for removing DC components acting as drift to be superimposed on the detection signal is low. With the present embodiment also, such as shown in FIG. 1 as the shaking detection unit 25, there are provided the HPFs 28y and 28p, thereby removing drift.

Note however, as described in earlier, when an operation for shaking an imaging direction greatly is performed, such as panning or tilting or the like, excessive potential is held at the HPFs, considerable time is required for decreasing that potential to the original potential according to the signal from the angular velocity sensor. During this transition, a correct vibration amount detection signal according to the actual vibration cannot be obtained at the CPU 34 side, and consequently, an unsuitable shaking correction control result is caused.

Therefore, with the imaging apparatus 1 according to the present embodiment, an arrangement which will be described below is employed in order to obtain a suitable shaking correction control effect regardless of a state in which the imaging direction or the main unit of the imaging apparatus shakes equal to or greater than a certain level, such as panning or tilting or the like.

As an arrangement for shaking correction control (excessive-swing-handling control) handling such excessive swing, first, as for the CPU 34, as shown in FIG. 2, functional parts as a pan/tilt determination unit 56 and a timer 57 are provided.

The pan/tilt determination unit 56 is a portion for making determination (pan/tilt determination) regarding whether or not the imaging apparatus 1 main unit (a portion of the optical system unit 11) is in a greatly vibrating state as much as it is regarded as excessive swing. The vibration amount corresponding to excessive swing here means, for example, swing equal to or greater than a certain level as to the level when holding the imaging apparatus by hand to fix (swing due to shaking is caused actually since this is handheld shooting) the imaging direction (normal handheld shooting), for example, means swing at a level obtained at the time of a panning or tilting operation. In general, according to a panning or tilting operation, angular displacement exceeding a tolerance range whereby optical shaking correction can be performed, i.e., movement of an imaging image is apt to occur.

Now, in order to determine this excessive swing, first, a shaking detection signal is input from the shaking detection unit 25. Also, a signal indicating the status of an operation to be performed as to the shutter button 32 is input. As the status of an operation as to the shutter button 32, there are three states of a released state in which the shutter button 32 is not pressed at all, a half-pressed state, and a full-pressed state, and a signal indicating whether the shutter button 32 is in which state of these three states (operated state instruction signal) is input from the shutter button 32.

Also, with the pan/tilt determination unit 56 in this case, a detection signal indicating the position of the focus lens group Lz3 output from the focus lens position detection unit 17b, and a detection signal indicating the position of the zoom lens group Lz1 output from the zoom lens position detection unit 17d are acquired, whereby the position information of each of the focus lens group Lz3 and zoom lens group Lz1 can be obtained. Such position information is also used for pan/tilt determination.

Subsequently, the pan/tilt determination unit 56 performs pan/tilt determination as described later based on the acquired signals as described above, and executes on/off control as to switches making up the switch unit 27 according to the result thereof. Consequently, the above-mentioned excessive-swing-handling control is realized.

Figure 3:
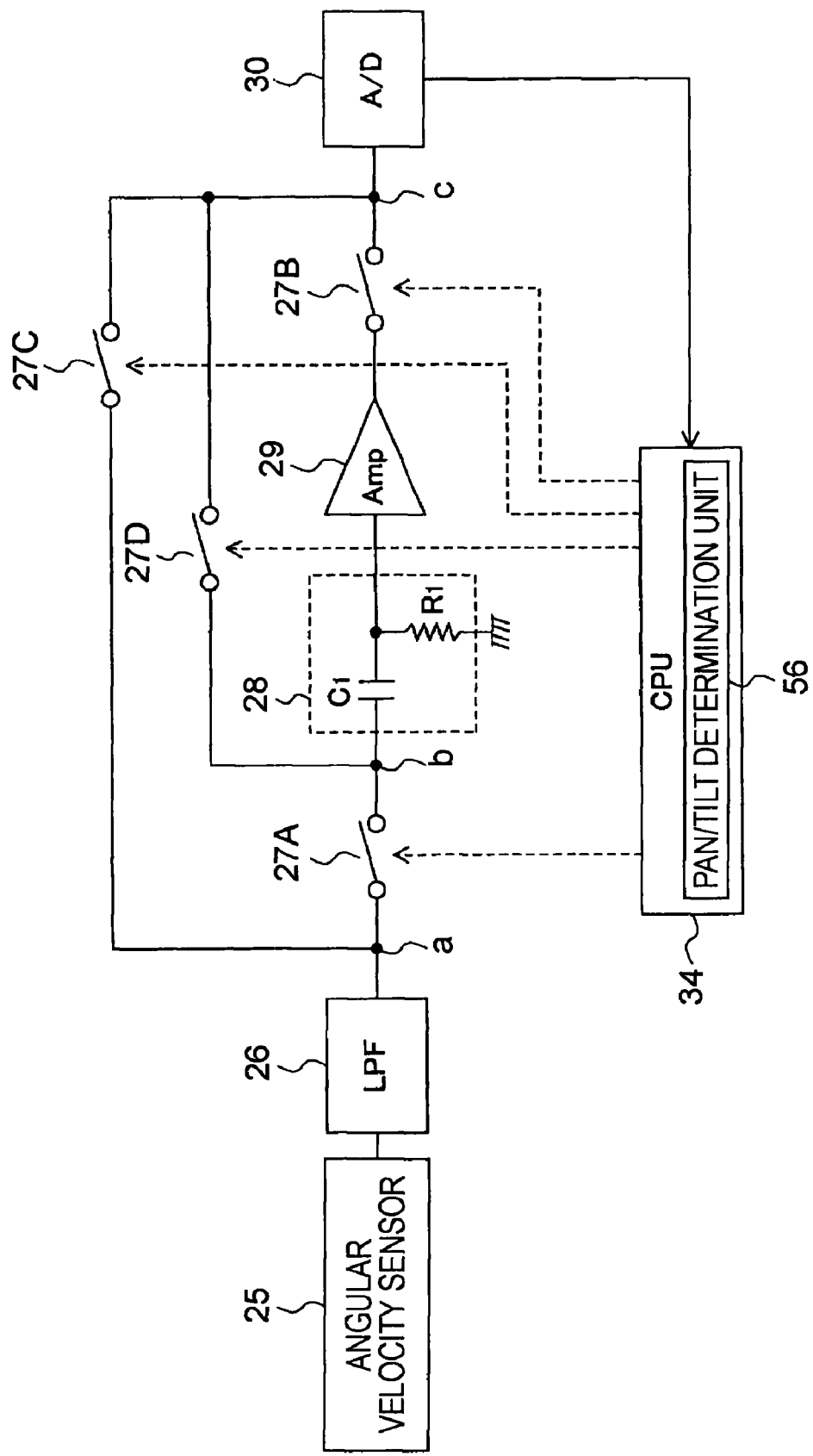
FIG. 3 is a diagram illustrating the configuration of a shaking detection unit, along with a specific example of the switch configuration of a switch unit.

FIG. 3 illustrates the switch configuration of the switch unit 27 more specifically as the configuration of the shaking detection unit 25 described with FIG. 2. Note that with the configuration shown in this drawing also, only the configuration corresponding to any one of the yawing direction system and the pitching direction system is illustrated.

The basic configuration illustrated in this drawing is configured of an angular velocity sensor 25, an LPF 26, an HPF 28, an amplifier 29, and an A/D converter 30, which also corresponds to FIG. 2. The high-pass filter 28 is, as shown in the drawing, configured of a capacitor C1 and a resistor R1, which are connected to the high-pass filter 28. Moreover, in practical use, the switch unit 27 is configured by disposing and inserting four switches of a first switch 27A, a second switch 27B, a third switch 27C, and a fourth switch 27D as shown in the drawing. Note that these switches may be made up of analog electronic switches employing a semiconductor device. Alternatively, these switches may be made up of mechanical switches such as a relay employing an electro-magnet, or a switches employing MEMS (Micro Electro Mechanical Systems) technology.

The first switch 27A is inserted between the output of the LPF 26 and the input of the HPF 27 (one of the pole terminals of the capacitor C1). The second switch 27B is inserted between the output of the amplifier 29 and the input of the A/D converter 30. The third switch 27C is inserted between the output of the LPF 26 and the input of the A/D converter 30. The fourth switch 27D is inserted between the connection point between the first switch 27A and the input of the HPF 28, and the input of the A/D converter 30. These first switch 27A, second switch 27B, third switch 27C, and fourth switch 27D are controlled to be turned on/off independently by the CPU 34 (pan/tilt determination unit 56).

Figure 4:
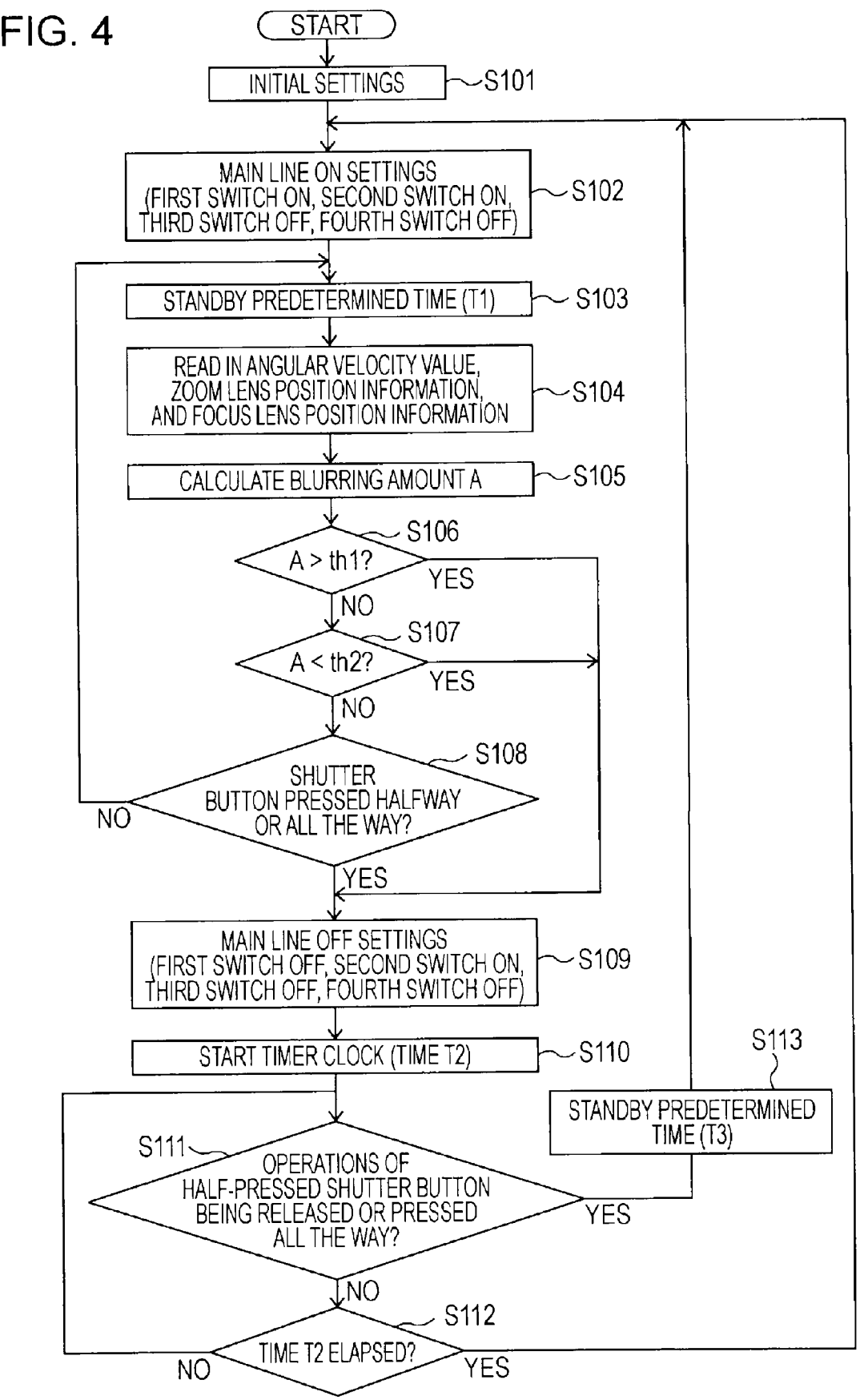
FIG. 4 is a flowchart illustrating an example of processing procedures for excessive-swing-handling control when in a still image photography mode.

The flowchart shown in FIG. 4 illustrates a processing example for controlling pan/tilt determination executed by the pan/tilt determination unit 56 when the still image shooting mode is set, and the switch unit 27 according to the determination result thereof. That is to say, this processing is processing for excessive-swing-handling control corresponding to the still image shooting mode.

Note that the processing procedures shown in this drawing can be regarded as processing obtained by the CPU 34 executing a program for realizing the function serving as the pan/tilt determination unit 56.

Also, with regard to this FIG. 4 also, only the processing corresponding to any one of the yawing direction and the pitching direction is illustrated. For example, if the processing shown in this drawing is processing corresponding to the yawing direction, the same processing procedure is also executed in parallel so as to correspond to the pitching direction.

The pan/tilt determination unit 56 first performs initialization settings as to various types of control parameters and so forth in step S101, for example, in response to power-on starting or the like.

Figure 10A:
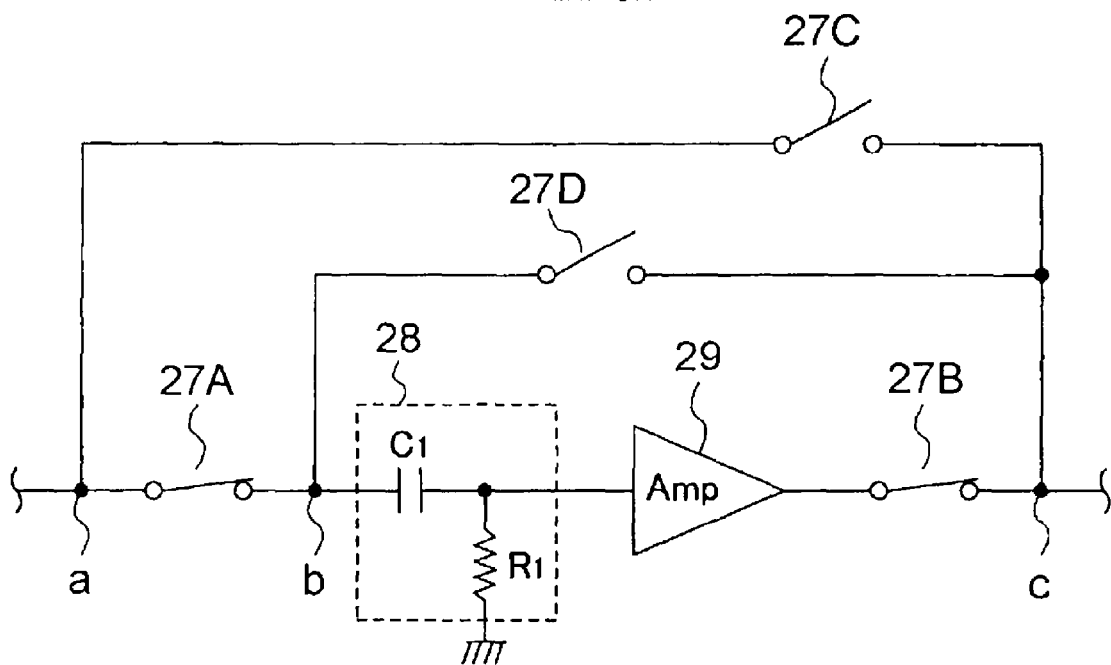
FIG. 10 is a diagram illustrating a setting example of an on/off pattern of the switch unit.

Subsequently, the pan/tilt determination unit 56 executes control for setting a main line on state in step S102. In order to realize this, the respective switches making up the switch unit 27 are set to an on/off state as shown in FIG. 10A. That is to say, on/off control is performed so as to obtain the following results.

First switch 27A=ON
Second switch 27B=ON
Third switch 27C=OFF
Fourth switch 27D=OFF As described above, the on/off state of each switch is set, whereby with the shaking detection unit 25, a mode is formed wherein the angular velocity sensor 25, LPF 26, HPF 28, amplifier 29, and A/D converter 30 are connected in series in this order. According to this connection mode, as can be understood from the above description, the original and basic function as the shaking detection unit 25 becomes effective, so in association with this, this connection mode is called a "main line on" state, here.

Upon the processing for setting the main line on being performed in step S102, in subsequent step S103, a standby state continues for predetermined time T1. As for the standby time T1, for example, around 10 msec. can be set, but for example, if there is reserve capacity in the computation capabilities of the CPU 34, around 0.1 msec. can be set. Also, as for this standby time T1, timekeeping is performed using the timer 57.

Following the standby of certain time in the above-mentioned step S103, the flow proceeds to step S104. In step S104, reading of an angular velocity value is performed by inputting the detection signal from the shaking detection unit 25 at that time, and also reading of the information of the respective positions of the focus lens group Lz3 and zoom lens group Lz1 is further performed by acquiring the detection signal from the focus lens position detection unit 17$b$ and the zoom lens position detection unit 17$d$.

In the next step S105, a blurring amount A is calculated using the angular velocity value, the position information of the focus lens group, and the position information of the zoom lens group when reading was performed in the above-mentioned step S104. The blurring amount A can be obtained with the following expression assuming that the angular velocity value is a, the position information of the focus lens group is x, and the position information of the zoom lens group is y.

$$A = k \times \alpha \times f(x,y) \quad \text{(Expression 1)}$$

With the above-mentioned (Expression 1), k is the coefficient of the angular velocity value $\alpha$, and is held at the correction property holding unit 31. When the pan/tilt determination unit 56 executes the procedure in step S105, this coefficient k is read from the correction property holding unit 31 and used for computation. Also, the function f(x, y) is for computing the distance to a subject based on the positions of the zoom lens group Lz1 and focus lens group Lz3. In the event of outputting the computation result as the function f(x, y), computation may be actually performed using a predetermined expression, or for example, an arrangement may be made wherein a table discretely storing the computation result corresponding to a combination of the parameters x and y is stored at the correction property holding unit 31, or the like, the corresponding computation result value is read from this table.

Also, the above-mentioned function f(x, y) is included in the terms of (Expression 1) for the sake of obtaining more appropriate blurring amount A by adding the positions of the zoom lens group Lz1 and focus lens group Lz3 to the angular velocity value at that time. Accordingly, depending on the computation capabilities of the CPU 34, the necessary precision of the pan/tilt determination capabilities, or the like, the blurring amount A may be obtained with the following expression that can be more simply represented.

$$A = k \times \alpha \quad \text{(Expression 2)}$$

Alternatively, an arrangement may be made wherein any one of the position information of the zoom lens group Lz1, and the position information of the focus lens group Lz3 is added to the angular velocity value, and the following expressions or the like are used.

$$A = k \times \alpha \times f(x) \quad \text{(Expression 3)}$$

$$A = k \times \alpha \times f(y) \quad \text{(Expression 4)}$$

In the next step S106, determination is made regarding whether or not A>th1 holds by comparing the blurring amount A calculated in the above-mentioned step S105 and a predetermined threshold th1. This threshold th1 is a threshold corresponding to an angular velocity value in the positive direction, and in the event that A>th1 holds, this can be treated as the case of movement (vibration) occurring, which is equivalent to movement (vibration) in the case of a panning or tilting operation being performed in the positive direction.

Note that as the case of a positive determination result being obtained here, the case of A>th1 holding continuously for certain time or more may be regarded as a condition, or the case of A>th1 temporarily holding may be regarded as a condition (e.g., the case of A>th1 holds as a result of sampling the blurring amount A once and comparing this with th1). That is to say, a temporal condition wherein A>th1 holds in order to obtain a positive determination result in step S106 may be set appropriately in light of a condition required for actual pan/tilt determination processing, or the like. This point can also be applied to establishment of A<th2 in the next step S107 in the same way.

In the case of a positive determination result being obtained in step S106, the flow proceeds to step S109. On the other hand, in the case of a negative determination result being obtained in step S106, the flow proceeds to step S107.

In step S107, with regard to the blurring amount A calculated in the previous step S105, determination is made regarding whether or not A<th2 holds. The threshold th2 is a threshold corresponding to an angular velocity value in the negative direction, and the case of A<th2 holding means that movement (vibration) occurs, which is equivalent to movement (vibration) in the case of a panning or tilting operation being performed in the negative direction. Accordingly, there is a relation of th1>th2 between the thresholds th1 and th2.

In the case of a positive determination result being obtained in this step S107 as well, the flow proceeds to step S109. On the other hand, in the case of a negative determination result being obtained, the flow proceeds to step S108.

In step S108, determination is made regarding whether or not which operation of a half-pressing operation from a released state, and a full-pressing operation at a stretch from a released state without passing through a half-pressed state has been performed on the shutter button 32 as a shutter operation.

In the case of an operation as to the shutter button 32, such as half-pressing or full-pressing at a stretch or the like, being performed, greater swing of the imaging apparatus main unit than that in a normal handheld shooting state occurs. With the present embodiment, swing of the imaging apparatus main unit caused by such an operation as to the shutter button 32 being performed is also an object of pan/tilt determination. That is to say, with the present embodiment, swing of the imaging apparatus main unit caused in response to a shutter button operation is treated as the same as swing of the imaging apparatus main unit caused in response to a panning or tilting operation.

In step S108, a shutter button operation, which is one situation causing such swing of the imaging apparatus main unit (equivalent to a particular situation causing a result for providing particular change on the detection signal of the angular velocity sensor 25 (the vibration amount detected by the vibration amount sensor)), is directly determined from a signal indicating a state from the shutter button 32. For example, it is possible to determine that an operation is performed as to the shutter button 32 using the detection signal from the shaking detection unit 25, but the shutter button 32 is a mechanical portion, so a signal indicating, in response to a performed operation, the state thereof can be obtained from the shutter button 32 in a sure manner. Therefore, with the present embodiment, certainty thereof is expected, so an arrangement is made wherein occurrence of swing and vibration in response to a shutter button operation is detected with the signal from the shutter button 32.

In the case of a positive determination result being obtained in step S109, the flow proceeds to step S109. On the other hand, in the case of a negative determination result being obtained, the flow returns to step S103.

In the case of resulting in step S109, this means that determination is made that greater swing and vibration than that at the time of normal handheld shooting by a certain level or more, which is equivalent to a panning or tilting operation, occurs as the determination result of the pan/tilt determination unit 56.

Figure 10B:
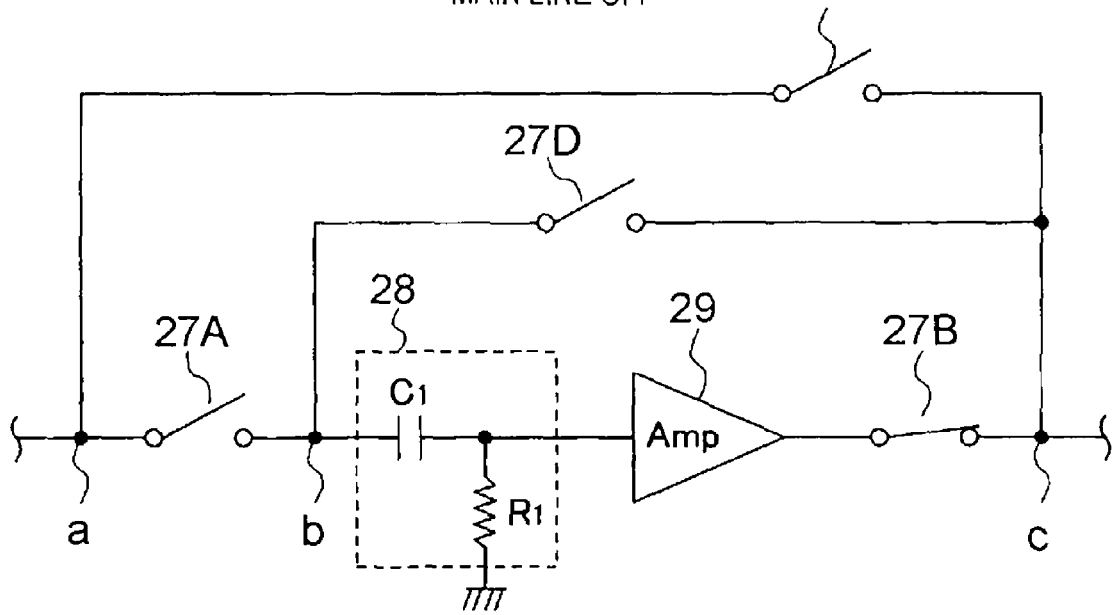

Therefore, in step S109, control processing for the main line off setting is executed. In order to realize this, as control as to the switch unit 27, as shown in transition from FIG. 10A to FIG. 10B, the first switch 27A which has been in an ON state is turned into an OFF state, following which the remaining second through fourth switches 279 through 27D are kept in the same state as the state at the time of the main line on. That is to say, the second switch 27B is kept in an ON state, and the third switch 27C and fourth switch 27D are kept in an OFF state.

Upon the main line off state being thus selected, and the first switch 27A being thus turned into an OFF state, the detection signal of the angular velocity sensor 25 passes through the LPF 26, and is intercepted at a stage for inputting to the HPF 28. Thus, the subsequent detection signals from the angular velocity sensor 25 are prevented from inputting to the HPF 28. At this time, greater swing and vibration than that at the time of normal handheld shooting by a certain level or more occurs, so the detection signal obtained at the angular velocity sensor 25 includes a fairly great absolute value as to the reference value in accordance with the swing and vibration thereof. That is to say, setting the main line off prevents an excessive detection signal corresponding to panning or tilting (including shutter button operations) from inputting to the HPF 28.

Following the state of the main line off being set in the above-mentioned step S109, in step S110 the timer 57 is controlled to start the timekeeping of the time T2. Thereupon, in the next step S111, determination is made regarding whether transition from a half-pressed state to a released state or transition from a half-pressed state to a full-pressed state occurs as a result of a shutter button operation. This determination processing is repeated in step S112 until determination is made that the time T2 of which the timekeeping has been started in step S110 elapses. Subsequently, in the case of the above-mentioned shutter button operation is performed in step S111, and a positive determination result is obtained, the flow stands by for predetermined time T3 in step S113, and then returns to step S102. Note that with the standby for the predetermined time T3 in step S113, the timer 57 is used.

Operations obtained by the processing of the excessive-swing-handling control described with reference to FIG. 4 will be described in light of operation examples corresponding to an actual imaging apparatus 1, with reference to FIGS. 5 through 7.

Figure 5:
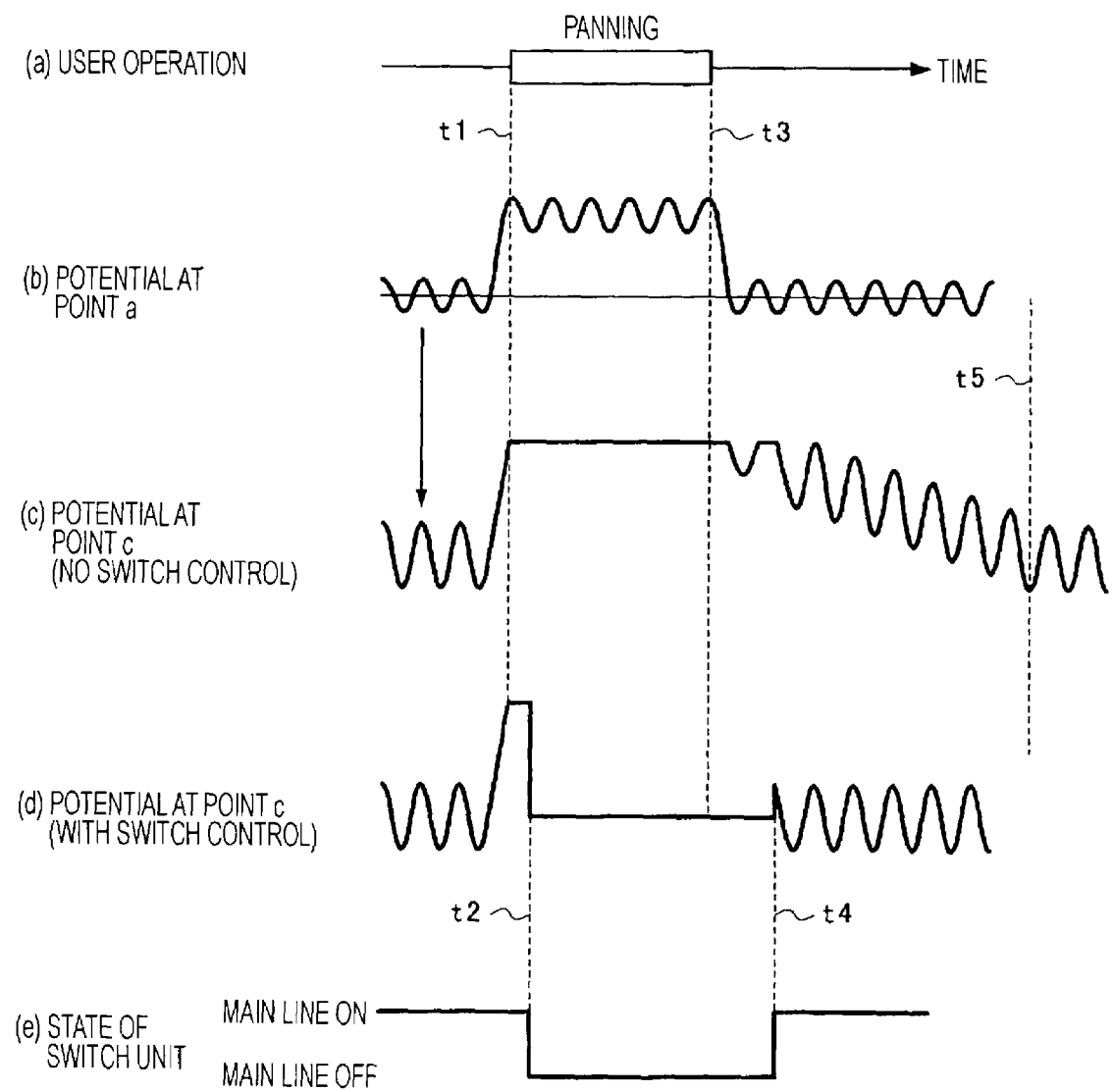
FIG. 5 is a diagram illustrating an operational example of an imaging apparatus obtained based on the flowchart shown in FIG. 4.

In FIG. 5, (a) illustrates user operations as to the imaging apparatus 1 over time. This (a) in FIG. 5 illustrates a state wherein the user has been performing normal handheld shooting up to point-in-time t1, then starts panning operations lasting to point-in-time t3, and from point-in-time t3 returns to normal handheld shooting.

The waveform of signal components made up only of true angular velocity corresponding to vibrations due to shaking and operations such as panning and tilting and so forth is as shown in (b) in FIG. 5, as detection signals detected by the angular velocity sensor 25 in accordance with such operations. Also, (b) in FIG. 5 shows change in angular velocity corresponding to operations including shaking at the time of normal handheld shooting. Accordingly, the waveform of (b) in FIG. 5 can be said to be an ideal potential regarding point a at the shaking detection unit 25 shown in FIG. 3. DC component acting as drift is superimposed on the actual potential at point a at the shaking detection unit 25 as described above, but this drawing illustrates an ideal waveform from which the drift component has been removed beforehand for the point a potential in (b) in FIG. 5, to facilitate description.

With regard to the angular velocity corresponding to the operations indicated by (b) in FIG. 5 (potential at point a), fluctuation follows a cycle and level corresponding to normal handheld shooting near the reference value up to point-in-time t1, but exhibits a very large absolute value from point-in-time t1 to point-in-time t3 in accordance with the panning operation, and returns to the same normal fluctuation as that at point-in-time t1 due to returning to normal handheld shooting at point-in-time t3.

In FIG. 5, (c) illustrates the potential of the output of the amplifier 29 obtained in a case wherein the main line on state (first switch 27A on, second switch 27B on, third switch 27C off, fourth switch 27D off) is maintained stationary (i.e., potential at point c in FIG. 2), rather than performing main line on/off control (switch control), as with the present embodiment.

In the event that the on state of the main line is maintained, an excessively great detection signal continues to be input to the HPF 28 over a relatively long period from point-in-time t1 through point-in-time t3, as shown in (b) in FIG. 5. Accordingly, for the waveform of the potential at point c that is obtained in the period from point-in-time t1 through point-in-time t3, a saturated and clipped state due to being amplified at the amplifier 29 continues, as shown here.

Next, corresponding to the point-in-time t3 passing and the panning operation ending, the waveform of the potential at point a returns to the waveform corresponding to the normal handheld shooting as shown in (b) in FIG. 5, and due to the on state of the main line having been maintained, the capacitor C1 is in a sufficiently charged state. Accordingly, the potential at point c from the point-in-time t3 on does not immediately return to the state corresponding to the normal handheld shooting as with the potential at point a, but rather takes a very long time to return. In the drawing, the potential returns to the potential at point a over a period from point-in-time t3 to a point-in-time t5, which is a point-in-time a certain amount of time elapsed from the point-in-time t3 (this period corresponds to the inverse number of the cut-off frequency of the HPF 28, as described earlier). While this will decrease over time, this can be viewed as being unwanted DC component superimposed on the angular velocity detection signal from point-in-time t3 on.

As described above, this residual DC component leads to unsuitable shaking correction control results. That is to say, from point-in-time t3 on, shaking correction control based on detection signals corresponding to (b) in FIG. 5 should be performed, but in reality, shaking correction control based on detection signals upon which an extremely great DC component has been superimposed, as in (c) in FIG. 5, is what is executed. Accordingly, up to the point-in-time t5, the optical axis of the optical system can be changed to that which is different from that which is desirable due to the effects of the DC component, resulting in undesirable shaking correction control. Conversely, in the case of the present embodiment, the potential at point c is as shown in (d) in FIG. 5.

In the case of the present embodiment, if a positive determination is made in step S106 or step S107 at the timing corresponding to point-in-time t2, which is a certain amount of time elapsed from point-in-time t1, a switchover is made from the main line on state to the main line off state, as indicated by (e) in FIG. 5. Accordingly, no signals are input to the HPF 28 thereafter. At this time, input of the downstream amplifier 29 is connected with the resistance R1 of the HPF 28 as pull-down resistance, so the amplifier 29 inputs signals equivalent to the imaging apparatus 1 being stationary. Accordingly, the potential at point c from point-in-time t2 on returns to a value corresponding approximately to the reference value.

Also, according to the flowchart in FIG. 4, as long as a positive determination is made in step S106 or step S107 due to a panning operation or the like, standby is made for the duration of the time T2 (step S112) and the flow returns to step S102 where the main line is set to on, immediately whereafter the main line is set to off. Accordingly, as shown in (e) in FIG. 5, the state of main line off can be viewed as being continuous.

Upon panning ending at point-in-time t3, the flow returns to step S102 and sets the main line to on at the timing of point-in-time t4 which is a certain amount of time elapsed from point-in-time t3, so a positive determination is no longer made in step S106 or step S107 (and step S108), so thereafter the state of main line on is maintained. At the timing prior to point-in-time t4 when switching to main line on, the potential at point c is approximately at the reference value. Accordingly, signals of a level suitable of the angular velocity value corresponding to normal handheld shooting can be obtained for the potential at point c following this point-in-time t4 as well. Consequently, suitable shaking correction control effects are obtained immediately following operations such as panning and tilting.

Figure 6:
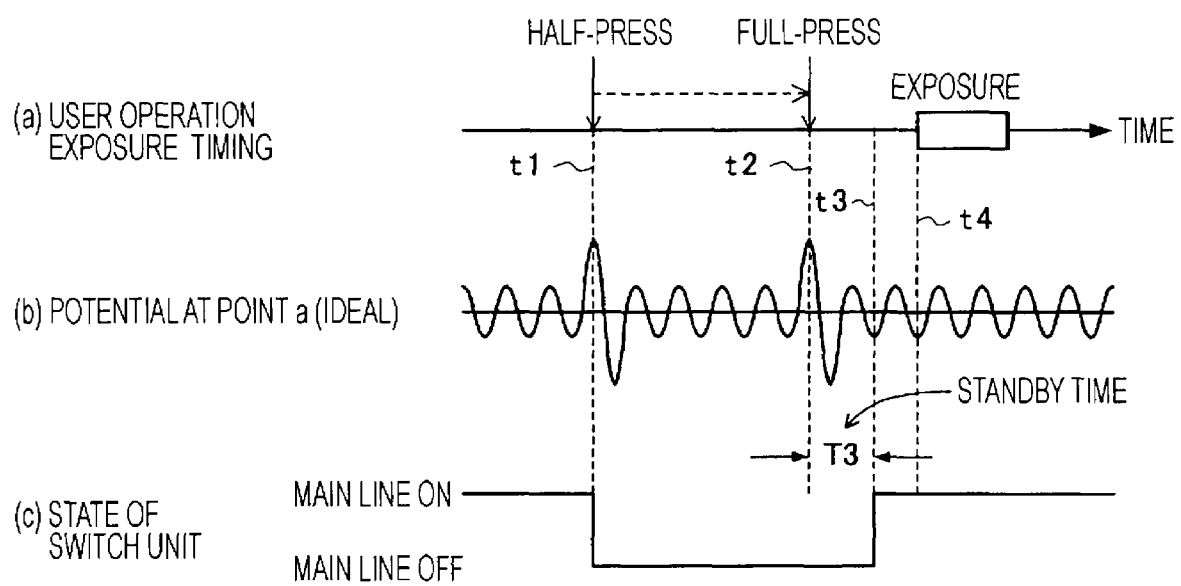
FIG. 6 is a diagram illustrating an operational example of an imaging apparatus obtained based on the flowchart shown in FIG. 4.

Also, in the event that the user first half-presses the shutter button for focusing (auto-focus) and subsequently fully presses from the half pressed state to photograph, behavior such as shown in FIG. 6 is exhibited.

Here, we will say that, from a normal handheld shooting state at the beginning, the user half-presses the shutter button to focus at point-in-time t1, and subsequently, at point-in-time t2 following a certain amount of time, fully presses the shutter button, as shown in (a) in FIG. 6. Also, we will say that exposure corresponding to the shooting instruction performed by fully pressing the shutter button is performed at point-in-time t4 which is a predetermined amount of time from point-in-time 2 as shown in (a) in FIG. 6. Further, we will say that the potential of the detection signal of the angular velocity sensor 25 obtained at point a in FIG. 3 via the LPF 26 exhibits greater amplitude than normal handheld shooting at the timings of point-in-time t1 and point-in-time t2 which correspond to shutter operations, as indicated in (b) in FIG. 6.

In accordance to such operations being made, the CPU 34 first determines that the shutter button 32 has been half-pressed at point-in-time t1 in step S108 in FIG. 4, and then performs the main line off setting in step S109 in FIG. 6. Accordingly, switching is made from the main line on state to the main line off state as indicated by (c) in FIG. 6 at a timing corresponding to the point-in-time t1, and input of excessive amplitude to the HPF 28 is almost shut off. Also, the half-pressed state is continuing from the point-in-time t1 to the point-in-time t2 at which the shutter button is pressed all the way, standby is made for the duration of the time T2 (step S112) and the flow returns to step S102 where the main line is set to on, immediately whereafter the main line is set to off. That is to say, as long as the half-pressing operation is continued without being released, the state of main line off can be viewed as being continuous as shown in (c) in FIG. 6.

In the event that the shutter button is fully pressed from the half-pressed state at point-in-time t2, the positive determination results are obtained at step S111, so the flow returns to step S102 and switches to main line on settings at the timing of the point-in-time t3 after standby of a predetermined time T3 therefrom, and thereafter, the state of main line on is maintained. Thus, the amplitude of the detection signal is increased due to the full-pressing at point-in-time t2, but main line off is maintained for the time T3 from the point-in-time t3, so this excessive amplitude is not input to the HPF 28, and the approximate reference value state from before point-in-time t2 is maintained. At the stage of switching to main line on at point-in-time t3, potential at the point a corresponding to normal handheld shooting is input to the HPF 28, so suitable shaking correction control operations are obtained. The exposure timing arrives at the point-in-time t4 which is a predetermined amount of time from the point-in-time t3, at which photography is performed in a state with appropriate shaking correction control operations being realized. As can be understood from FIG. 6, the predetermined time T3 at step S113 should be set taking into consideration the time from the full-pressing operation to starting of exposure.

Figure 7:
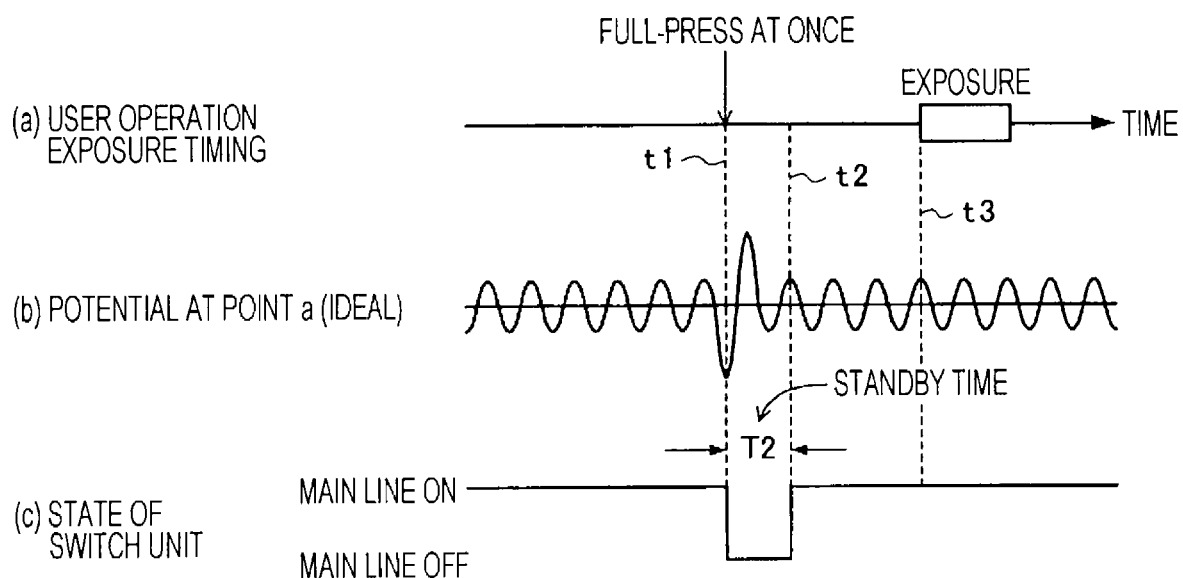
FIG. 7 is a diagram illustrating an operational example of an imaging apparatus obtained based on the flowchart shown in FIG. 4.

Also, a case wherein the user has full-pressed the shutter button all at once from a released state, as a shutter button operation, is as shown in FIG. 7. In this case, we will say that the user has full-pressed the shutter button all at once from a normal handheld state at the timing of point-in-time t1 for shooting as shown in (a) in FIG. 7. Exposure is started at the point-in-time t3 which follows this point-in-time t1 by a predetermined amount of time, thereby performing actual photography recording. The potential at point a corresponding to the operation at the above point-in-time t1 exhibits an amplitude greater than when performing normal handheld shooting at the timing corresponding to the point-in-time t1, as indicated by (b) in FIG. 7.

As processing corresponding to the above operations, the CPU 34 determines in step S108 in FIG. 4 that the shutter button 32 has been full-pressed all at once at the point-in-time t1, and switched to main line off settings at step S109 at this timing, as shown in (c) in FIG. 7. Thus, input of signals having excessive amplitude corresponding to the full-pressing operations to the HPF 28 is shut off.

Following the full-pressing operations of the shutter button 32 all at once, the user normally immediately releases the shutter button 32, so following the processing in step S109, the flow returns to step S102 at the timing of the point-in-time t2 where determination is made in step S112 that the initial time T2 has elapsed, in step S102 main line on is set, and thereafter this state is maintained. At timing following this point-in-time t2, the potential at point a exhibits a waveform corresponding to normal handheld shooting after the period of excessive amplitude due to the full-press operation, so at the exposure timing at the point-in-time t3, shooting is performed in a state wherein suitable shaking correction control has been obtained. Note that the standby time T2 set regarding steps S110 and S112 should be set taking into consideration the time from performing the full-press all at once till starting of the exposure.

As can be clearly understood from FIGS. 5 through 7, the processing procedures illustrated in FIG. 4 realize excessive-swing-handling control at the time of shooting a still image.

Note that a configuration can be conceived wherein such excessive swing can be handled by implementing a variable resistance value, i.e., the time constant, at the portion corresponding to the high-pass filter, thereby suppressing superimposing of DC component due to excessive angular velocity signals.

However, with such a configuration, allowing variation of resistance values also changes the charging potential corresponding to capacitor drift. Accordingly, at the point that the swinging state has ended and the time constant is returned to the original value, the charging potential of the capacitor has changed to a value not corresponding to the actual drift, meaning that suitable shaking correction control may not be able to be executed.

In comparison with this, the present embodiment is of a configuration where input of detection signals is cut off to the high-pass filter (HPF 28), so charging potential corresponding to the drift at that time is held at the capacitor and is not carelessly changed. Note that during the period from ending of the excessive swinging state to returning to input of detection signals to the high-pass filter, i.e., during the period in which no detection signals are input to the high-pass filter, there is change in the drift superimposed on detection signals strictly speaking, but in actual operations, input of detection signals is shut off to the high-pass filter for only a few seconds at the very most, which is extremely short as compared to the drift cycle. Accordingly, the drift potential at the time of returning to input of detection signals to the high-pass filter and the potential held at the capacity are approximately the same, so there is no possibility of this leading to error in the shaking correction control.

Next, excessive-swing-handling control when shooting moving images will be described. Shaking also occurs when shooting moving images, and accordingly, the imaging apparatus 1 according to the present embodiment is configured to be capable of executing shaking correction control using the shaking correction control configuration described with reference to FIGS. 1 through 3 when shooting moving images as well. However, operations such as panning or tilting or the like results in accordingly excessive amplitude being input to the HPF 28 from the angular velocity sensor with the case of shooting moving images as well. Accordingly, shaking correction control when returning to normal handheld shooting following the panning or tilting operations will be unsuitable unless some sort of measures are implemented. Thus, it is necessary to perform excessive-swing-handling control in the same way as with the case of still photography.

Figure 8:
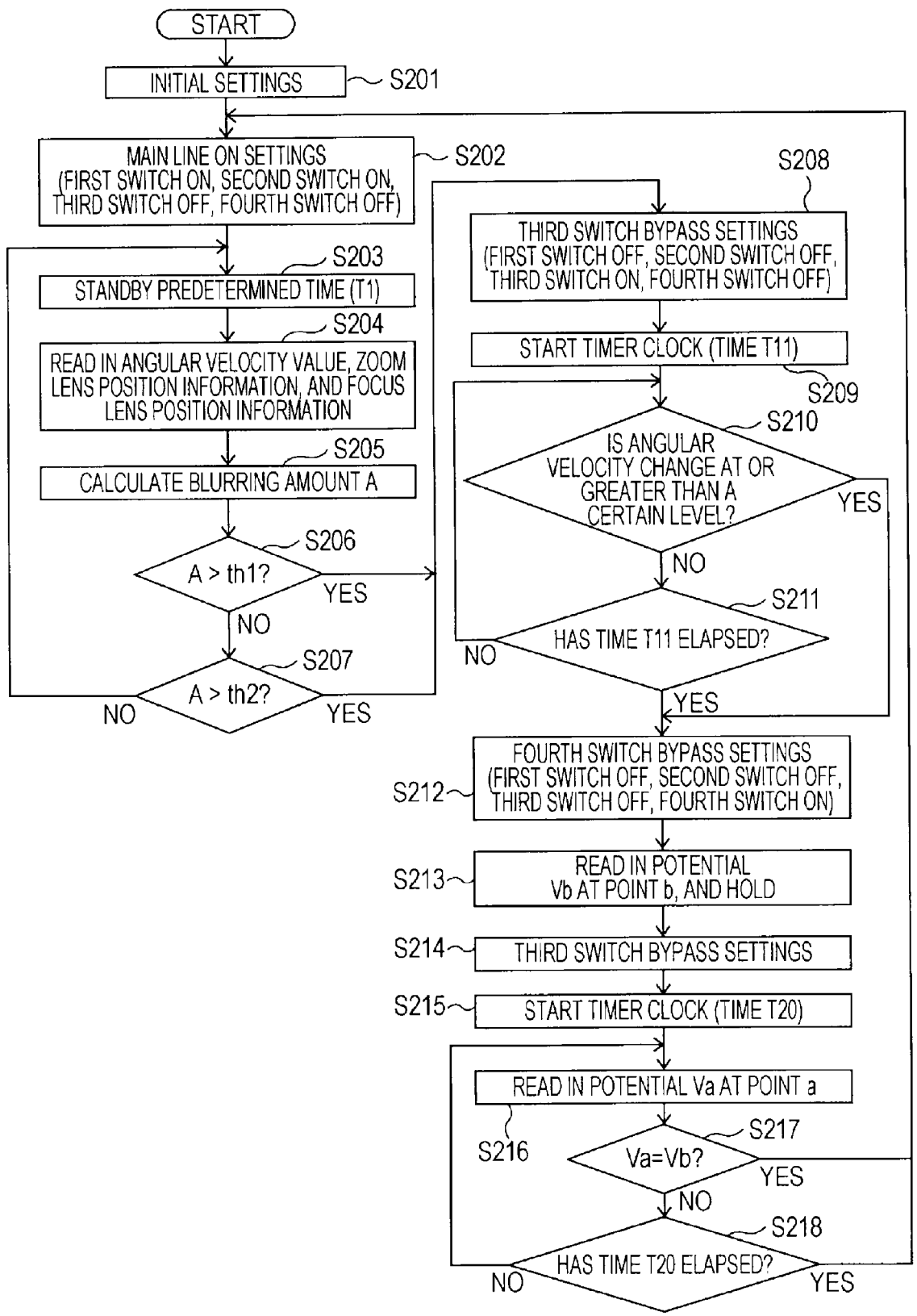
FIG. 8 is a flowchart illustrating an example of processing procedures for excessive-swing-handling control when in a moving image shooting mode.

The flowchart in FIG. 8 illustrates a processing procedures example for excessive-swing-handling control which the CPU 34 (pan/tilt determination unit 56) executes when shooting moving images.

First, the procedures of steps S201 through S207 are the same as the procedures of steps S101 through S107, so description thereof will be omitted here. Note however, that with regard to the standby time T1 set in step s203, the computation expression for obtaining the blurring amount A in step S205, and the threshold values th1 and th2 to be set corresponding to steps S206 and S207 may be values set differently from the case of executing the processing in FIG.

4 corresponding to still shooting, so as to be suitable for shooting moving images. Also, the processing equivalent to that in step S108 in FIG. 4 is processing assuming shutter operations unique to still photography, and accordingly will be omitted in FIG. 8.

Figure 11A:
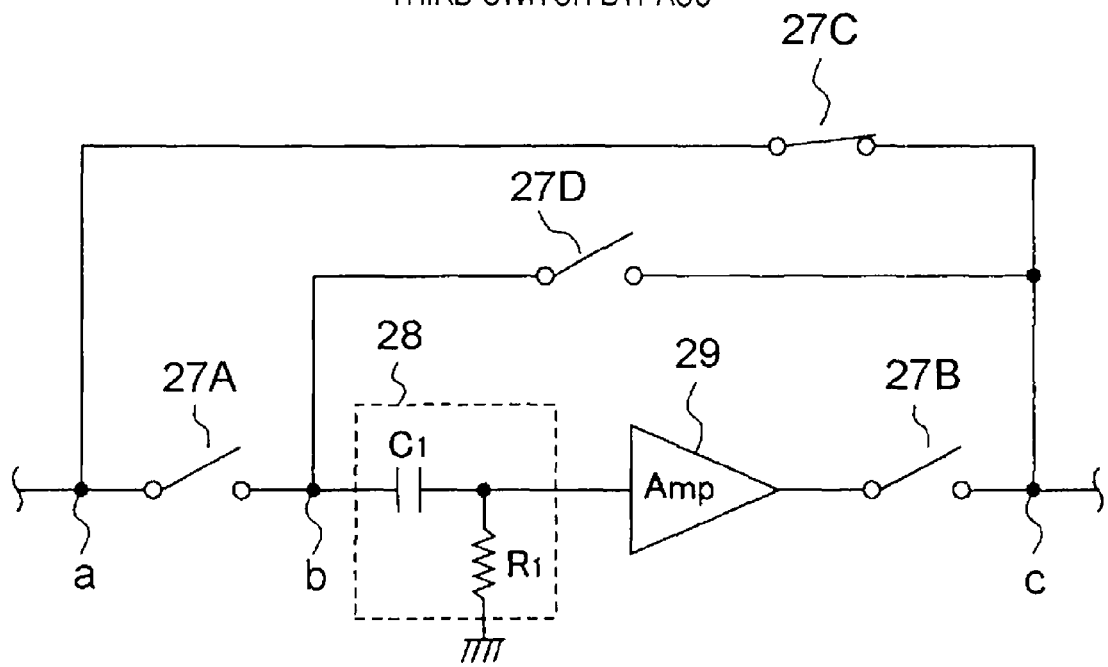
FIG. 11 is a diagram illustrating a setting example of an on/off pattern of the switch unit.

In the event that positive determination results are obtained in step S206 or step S207, the flow proceeds to step S208. In step S208, a "third switch bypass" state is set instead of the main line off setting of step S109 in FIG. 4 described above. This third switch bypass state is set such that
 First switch 27A=OFF
 Second switch 27B=OFF
 Third switch 27C=ON
 Fourth switch 27D=OFF
as shown in FIG. 11A. That is to say, only the third switch 27B is on, and the remaining switches are all off. By making this third switch by pass setting, the detection signals of the angular velocity sensor 25 which have passed through the LPF 26 are input to the A/D converter 30 without going through the HPF 28 and amplifier 29, as can be seen from FIG. 11A. That is to say, the detection signals of the angular velocity sensor 25 which have passed through the LPF 26 are not amplified, but are not passed through the HPF 28, and these signals are input to the CPU 34 as angular velocity detection signals. When shooting moving images, shaking correction control needs to be continuously operating, so an arrangement is necessary wherein detection signals of excessive amplitude are not passed through the HPF 28, and further, detection signals are continuously input to the CPU 34. The third switch bypass is a path formed for this purpose.

Also, setting the third switch bypass state in step S208 involves a state transition from the main line on state up till that point, wherein first the first switch 27A and second switch 27B are turned off, following which the third switch is switched over from off to on.

That is to say, switches which had been on up to this time are all switched off so that all switches are temporarily off, following which the necessary switches are switched on. This temporarily prevents the capacity C1 at the HPF 28 from short-circuiting. For example, if the third switch 27C were first switched on from the main line on state in step S208, the input of the HPF 28 and the output of the amplifier 29 would short-circuit, consequently short-circuiting the capacitor C1.

In the following step S209, timekeeping of the time T11 by the timer 57 is started. Following this, determination is made in step S210 regarding whether or not the change of angular velocity value indicated by the angular velocity detection signals acquired from the A/D converter 30 have reached a certain level or higher, during the period up to determination being made that the time T12 has elapsed in step S211.

In step S208, immediately following setting of the third switch bypass, the angular velocity value of the angular velocity detection signals acquired from the A/D converter 30 assumes a fairly great absolute value corresponding in magnitude to starting of panning or tilting operations, and the significantly great value is maintained as long as that operation is maintained. When the panning or tilting operations end, the angular velocity value accordingly returns to the normal small value corresponding to normal handheld shooting. In step S210, ending of panning or tilting operations is determined by detecting change in relatively great angular velocity values corresponding to ending of such panning or tilting operations which have been performed. DC component is superimposed as drift on the actual a point potential, so using this as angular velocity detection signals to execute accurate shaking correction control is difficult, but potential difference clearly of a certain level or greater occurs at the point a with regard to starting and ending of such panning operations. That is to say, there is no particular problem with determining ending of panning operations and the like based on the a point potential. Excessive-swing-handling control requires accurately recognizing the timing at which the panning or tilting operation has ended, and the procedure of step S210 enables this. Following ending of the panning or tilting operation, i.e., upon detecting change in angular velocity values of or exceeding a certain level, thereby obtaining positive determination results in step S210, the flow advances to step S212.

Also, in cases wherein determination is made in step S211 that the predetermined time T11 has elapsed, this also is determined to be the end of panning or tilting operations, and the flow advances to step S212.

Figure 11B:
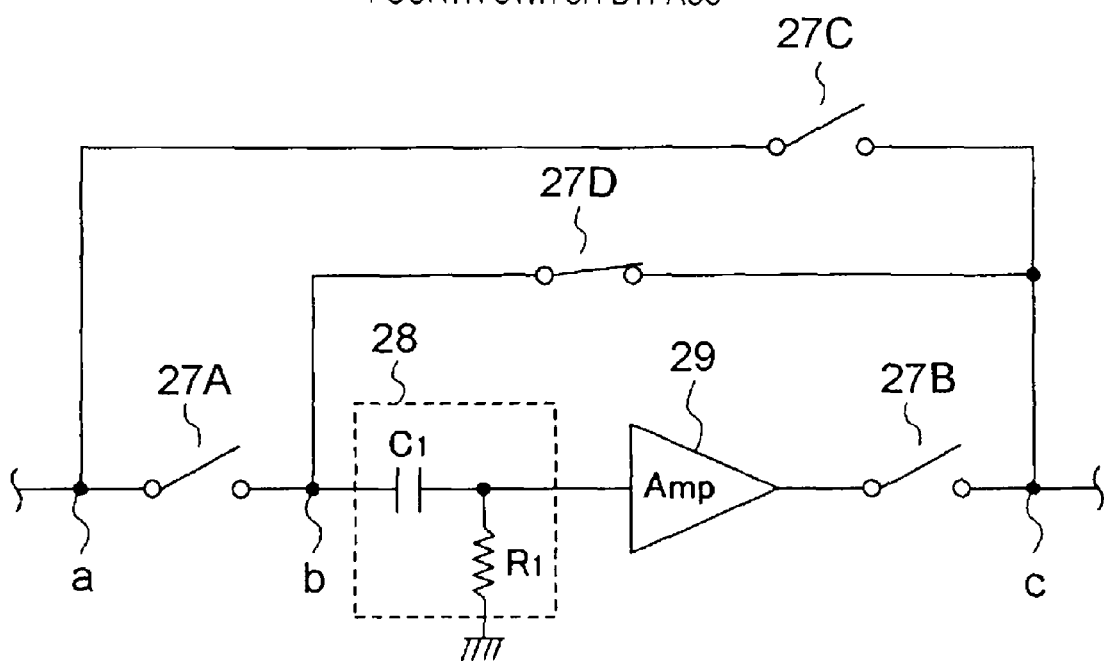

In step S212, switch control is executed to set a "fourth switch bypass" state. This fourth switch bypass state is set such that
 First switch 27A=OFF
 Second switch 27B=OFF
 Third switch 27C=OFF
 Fourth switch 27D=ON
as shown in FIG. 11B. When setting this fourth switch bypass, switches which had been on up to this time are all switched off by switching the third switch 27C off from the earlier third switch bypass state, so that all switches are temporarily off, following which the fourth switch 27D is turned on, thereby preventing short-circuiting in the same way as with step S208.

With this fourth switch bypass setting, the potential at point b is input to the CPU 34 from the angular velocity detection signal port, with the pan/tilt determination unit 56 of the CPU 34 acquiring the potential at point b and holding this as the value of potential Vb in step S213.

In the following step S214, the third switch bypass state is set again from the above fourth switch bypass state. At this time as well, the fourth switch 27D is switched off from the earlier fourth switch bypass state, so that all switches are temporarily off, following which the third switch 27C is switched on to form the third switch bypass state, thereby preventing short-circuiting.

Thus setting the third bypass state realizes a state wherein detection signals from the angular velocity sensor 25 which have passed through the LPF 26 again, i.e., the potential at point a, to be acquired by the CPU 34.

Now, in the state that the third switch bypass has been set, in step S215 the pan/tilt determination unit 56 starts timekeeping with the timer 57 in order to clock a predetermined time T20 that has been set for preventing an indefinite loop of step S216, and in step S216 the potential Va at point a is read in. In step S217, the value of the potential Va read in step S216 and the potential Vb read in and held in step S213 earlier are compared, and determination is made regarding whether or not Va=Vb holds.

First, in the event that negative determination results are obtained in step S217, in step S218 determination is made regarding whether or not the time T20 regarding which timekeeping has been started in step S215 has expired. In the event that negative determination results are obtained in step S218, the flow returns to step S216, the potential Va is read in anew, and comparison determination is made with potential Va in step S217 again. Conversely, in the event that positive determination results are obtained, the flow returns to step S202, and the main line on state is set. The procedures for returning from step S218 to S202 means that the excessive-swing-handling control is reset and operations thereof are resumed from the beginning.

In the event that determination is made in step S217 that Va=Vb within the time until the time T20 passes, the flow returns to step S202 and the main line on state is set. Note that in returning to step S202 as well, the third switch is turned off so as to turn all switches off, following which the first switch 27A and second switch 27B are switched on so as to realize the main line on state.

Figure 9:
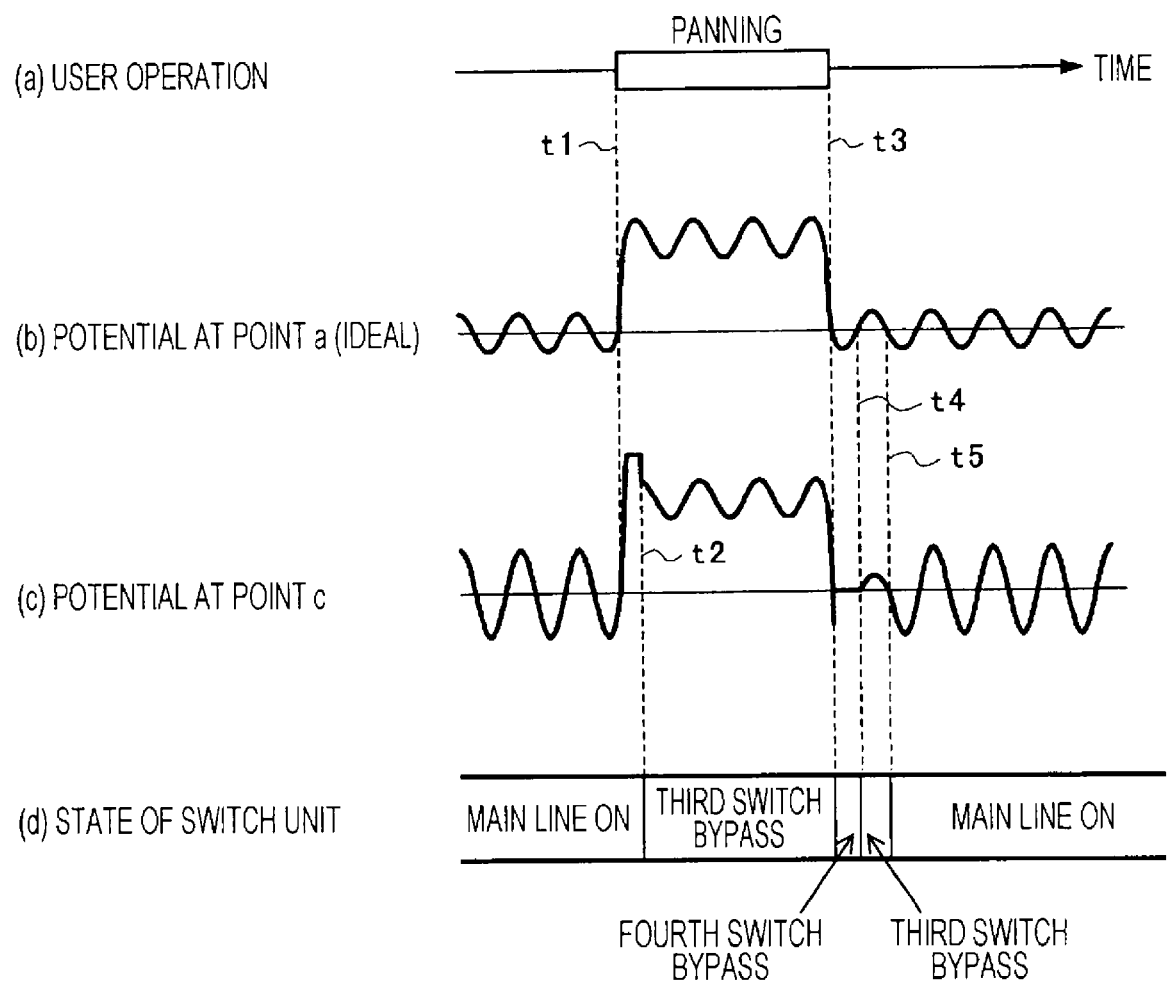
FIG. 9 is a diagram illustrating an operational example of an imaging apparatus obtained based on the flowchart shown in FIG. 8.

An example of operations obtained by the processing procedures shown in FIG. 8 is shown in FIG. 9. In FIG. 9, (a) illustrates a user operation example over time when shooting moving images. In this case, the user starts panning at point-in-time t1 from a normal handheld shooting state, the panning operation ending at the point-in-time t3 which is a point-in-time at which a certain amount of time has elapsed from the point-in-time t1, and returning to the normal handheld shooting state.

As indicated in (b) in FIG. 9, the angular velocity change (ideal a point potential) corresponding to the operations in (a) in FIG. 9 fluctuates around the reference value corresponding to normal handheld shooting up to point-in-time t1, but during the period when panning operations are performed from point-in-time 2 through point-in-time 3, amplitude of a very great absolute value continues, and after point-in-time t3 when returning to normal handheld shooting again, the fluctuation returns to a correspondingly small level.

Also, the potential at point c, which is manifested as corresponding to the waveform in (b) in FIG. 9 which corresponds to the potential at point a, first is a waveform wherein signals corresponding to the normal handheld shooting are amplified up to point-in-time t1, as shown in (c) in FIG. 9, and then changes to an amplitude so great as to be clipped, due to panning operations being started from point-in-time 1. At point-in-time t2, which is point-in-time following the point-in-time t1 by a predetermined amount of time, positive determination results are obtained in step S206 or S207, and in step S208 the third switch bypass is set as indicated in (b) in FIG. 9. Accordingly, the potential at point c in (c) in FIG. 9 exhibits the output of the LPF 26 which has passed the HPF 28 and amplifier 29 at point-in-time t2 on, i.e., signals of the actual potential at point a. During the period of the panning operations from point-in-time t2 on, the CPU 34 inputs signals of the potential at point a, obtained at point c in this way. The reason that the CPU 34 acquires the signals of the potential of point a is to detect when the change of angular velocity value reaches a certain level or greater in step S210, and to use this to determine the end of the panning operations.

In the case of FIG. 9, at point-in-time t3, positive determination results are obtained in step S210 due to the potential at point a returning to fluctuation at a small value corresponding to normal handheld shooting due to the panning operations having ended. Accordingly, the state of the switch unit 27 is switched from the third switch bypass to the fourth switch bypass at point-in-time t3 in step S212, as indicated in (d) in FIG. 9. In step S213, the CPU 34 reads in and saves the potential at point b obtained corresponding to this point-in-time t3 (corresponding to the charging charge of the capacitor C1 at this time), and at the timing of point-in-time t4, sets the third switch bypass state again in step S214.

From this point-in-time t4 on, the CPU 34 executes the procedures of steps S215 and S216. That is to say, from point-in-time t4 on, the third switch bypass is set, whereby the CPU 34 inputs the actual a point potential as angular velocity direction signals. The pan/tilt determination unit 56 of the CPU 34 reads these in and compares with the b point potential read in and held at a timing corresponding to the point-in-time t3 earlier, and stands by until both match.

In the example in FIG. 9, positive determination results are obtained in step S216 at the point-in-time t5 that both match. Accordingly, at point-in-time t5, the flow returns to step S202, at which point settings are switched to the main line on setting as indicated by (d) in FIG. 9, and thereafter, normal shaking correction control is resumed.

In FIG. 9, during the period up to point-in-time t1 when main line on is set, the user is performing normal handheld shooting, and shaking correction control is executed based on the normal angular velocity detection signals obtained corresponding to shaking at this time (signals acquired by the CPU 34 from the shaking detection unit 25 in the state of main line on). Due to shaking correction control processing performed at this time, anticipated shaking correction effects are realized.

Next, the third switch bypass is set corresponding to the period from point-in-time t1 to point-in-time t2 corresponding to the period of panning operations, whereby the CPU 34 inputs the potential at point a as angular detection signals, and executes shaking correction control based on this, but due to panning operations being performed, the image being taken is already changing greatly, so the user will not notice anything unnatural in shaking correction control at this time. On the other hand, the potential at point a is input to the CPU 34, so the pan/tilt determination unit 56 of the CPU 34 can accurately determine the ending of the panning operations in step S210.

Also, subsequently, positive determination results are obtained in step S210 for example, or a certain amount of time elapses at step S211, whereby determination is made that panning operations have ended corresponding to the point-in-time t3. As an arrangement other than the present embodiment regarding subsequent procedures, a configuration can be conceived wherein, immediately as soon as determination is made that panning operations have ended at the point-in-time t3, the state is switched to main line on so as to go to normal shaking correction control. That is to say, from the point-in-time t2 where the third switch bypass is set, detection signals with an excessively great amplitude are not input from the angular velocity sensor to the HPF 28, and the output thereof is not superimposed with DC component. Accordingly, no DC component is superimposed on the output of the HPF 28 thereafter even if the main line is switched on at point-in-time t3 when the panning operations have ended, and normal angular velocity detection signals corresponding to detection signals of the angular velocity sensor are obtained.

However, switching from the third switch bypass to main line on means switching the first switch 27A from on to off. In this case, there is no guarantee that the potential at both ends of the first switch 27A (i.e., a point potential and b point potential) match at the timing of switching to main line on at the point-in-time t3. The potential at point a is the output of the LPF 26, and accordingly changes corresponding to the vibrations of the imaging apparatus 1 in accordance with operations, while on the other hand, the potential at point c, which was open at the input stage of the HPF 28, is fixed to a certain potential from point-in-time t1 to point-in-time t2.

In the event of switching to main line on at point-in-time t3, if there is discrepancy between the actual b point potential and a point potential, this may result in a situation wherein the potential difference is input to the HPF 28, and output superimposed as an unwanted DC component, i.e., a transient phenomenon. Performing shaking correction with this transient phenomenon will result in the optical axis correction lens group Lz2 being driven though it should not be, and accordingly suitable shaking correction effects cannot be obtained.

Accordingly, with the present embodiment, the procedures of steps S212 through S216 shown in FIG. 8 are provided. Accordingly, at the point-in-time t5 in FIG. 9 for example, switching to the main line on state is performed at a timing at which the potential at both ends of the first switch 27A actually match, and accordingly the above transient phenomenon does not occur.

Also, as described earlier, according to an embodiment of the present invention, an arrangement may be made for switching to main line on at the timing of determination being made that the panning (tilting) operations have ended at point-in-time t3 in FIG. 9, so as to go to normal shaking correction control from this point-in-time. That is to say, the algorithm is configured such that, in comparison with FIG. 8, instead of advancing from step S210 or step S211 to step S212, the flow returns to step S202. With this configuration as well, excessive input to the HPF 28 corresponding to panning or tilting operations or the like can be prevented, the primary cause leading to unsuitable shaking correction control is eliminated, and substantial effects can be actually obtained. Having said that, the present embodiment includes the procedures of steps S212 through S216 to give consideration to more suitable shaking correction control being resumed.

Also, the imaging apparatus 1 according to the present embodiment is capable of taking not only still images but also shooting moving images, and accordingly is configured so as to be capable of executing excessive-shaking-handling control for shaking correction control in both the still image shooting mode and moving image shooting mode.

However, if an imaging apparatus is to be configured to perform only taking of still images or only shooting of moving images, only functions for excessive-shaking-handling control corresponding to still images or functions for excessive-shaking-handling control corresponding to moving images need to be implemented.

Particularly, in a case of implementing only functions for excessive-shaking-handling control corresponding to the still image photography mode, the only switching preformed at the switch unit 27 is main line on/off, and further, is only on/off of the first switch 27A. Accordingly, in this case, a configuration can be made for the shaking detection unit 25 with the switch unit 27 only including the first switch 27A, and with the second switch 27B directly wired, and the third switch 27C and fourth switch 27D omitted.

Further, regarding excessive-swing-handling control for the still image photography mode, an arrangement may be made wherein excessive-swing detection corresponding to shutter button operations in step S108, step S111, and so forth, is omitted, and only detection of excessive-swing is performed for panning and tilting operations. Or, conversely, an arrangement may be made wherein detection of excessive-swing corresponding to panning and tilting operations is omitted, and only detection of excessive-swing corresponding to the shutter button operations is performed.

Also, with the imaging device 1 according to the present embodiment, a configuration is made wherein shaking correction is performed optically, having the optical axis correction lens group Lz2 whereby taken images are moved. However, the present invention is not restricted in particular regarding the technique for moving images in shaking correction. For example, a technique for moving images by shifting an entire frame vertically/horizontally by image signal processing may be applied.

Also, an embodiment has been described as a digital still camera, but this may be a video camera or the like instead. As of recent, video cameras which are capable of not only shooting moving images but also shooting still images have come into widespread use. Further, the present invention is applicable of shaking correction functions in common silver-salt still cameras as well. Moreover, in addition to such so-called imaging apparatuses, the present invention is applicable to apparatuses to which imaging functions have been provided, such as cellular phones and the like.

It should be understood by those skilled in the art that various modifications, combinations, sub-combinations and alterations may occur depending on design requirements and other factors insofar as they are within the scope of the appended claims or the equivalents thereof.

What is claimed is:

1. A vibration detecting device comprising:
   vibration amount detecting means including
      vibration amount sensor means for detecting a vibration amount and outputting a vibration detection signal indicating the detected vibration amount, and
      high-pass filter means for removing direct current (DC) components superimposed on the vibration detection signal;
   status detecting means for detecting a particular status that changes the vibration amount; and
   input control means for preventing said vibration amount detection signal from being input into said high-pass filter means in response to said particular status being detected by said status detecting means.

2. The vibration detecting device according to claim 1, wherein the particular status is a change satisfying a predetermined condition regarding the vibration amount indicated by said vibration amount detection signal.

3. The vibration detecting device according to claim 1, further comprising:
   operation information input means configured to input operation instruction information, which is output in response to a predetermined operating portion on which an operation relating to shooting of a still image is performed, indicating the content of the operation thereof;
   wherein said status detecting means are configured to detect that operation instruction information indicating the content of a predetermined operation is input with said operation instruction input means as said particular status.

4. The vibration detecting device according to claim 1, further comprising:
   cancellation condition determining means for determing whether a predetermined cancellation condition is satisfied when preventing said vibration amount detection signal from being input into said high-pass filter,
   wherein said input control means restores input into said high-pass filter of said vibration amount detection signal in response to said predetermined cancellation condition being satisfied.

5. The vibration detecting device according to claim 4, said cancellation condition determining means configured to determine that predetermined time has elapsed as a determination that said predetermined cancellation condition is satisfied.

6. The vibration detecting device according to claim 4, further comprising:
   operation information input means configured to input operation instruction information, which is output in response to a predetermined operating portion on which an operation relating to shooting of a still image is performed, indicating the content of the operation thereof;
wherein said cancellation condition determining means are configured to determine that predetermined time has elapsed since said operation information input means input operation information indicating the content of a predetermined operation as a determination that said predetermined cancellation condition is satisfied.

7. The vibration detecting device according to claim 4, said cancellation condition determining means configured to determine that change satisfying a predetermined condition regarding the vibration amount indicated with said vibration amount detection signal when performing shooting of a moving image occurs as a determination that said predetermined cancellation condition is satisfied.

8. The vibration detecting device according to claim 4, further comprising:
   holding means configured to hold first potential which is potential obtained when there is no input of a vibration detection signal at the input stage of said high-pass filter in response to said cancellation condition determining means determining that a predetermined cancellation condition is satisfied; and
   comparing means configured to compare said first potential held by said holding means, and second potential which is potential according to a vibration amount detection signal output from said vibration amount sensor;
   wherein said input control means restore input to said high-pass filter of said vibration amount detection signal in response to said comparing means determining that said first potential is equal to said second potential.

9. The vibration detecting device according to claim 8, said vibration amount detecting unit is provided with
   a first open/close switch to be serially inserted between the output of said vibration amount sensor and the input of said high-pass filter,
   a second open/close switch to be inserted at a predetermined position at a stage later than said high-pass filter,
   a third open/close switch to be inserted between the connection point of the output of said vibration amount sensor and said first open/close switch, and the output side end portion of said second open/close switch, and
   a fourth open/close switch to be inserted between the connection point of said first open/close switch and the input of said high-pass filter, and the output side end portion of said second open/close switch;
following which said vibration detecting device further comprising:
   switch control means configured to perform control so as to realize a first pattern which causes said first open/close switch and said second open/close switch to be turned on, and causes said third open/close switch and said fourth open/close switch to be turned off, when said input control means input said vibration amount detection signal to said high-pass filter,
   to perform control so as to realize a second pattern which causes at least said first open/close switch to be turned off, when said input control means prevent said vibration amount detection signal from being input to said high-pass filter,
   to perform control so as to realize a third pattern which causes said first open/close switch, said second open/close switch, and said fourth open/close switch, to be turned off, and causes said third open/close switch to be turned on in order to determine that change satisfying a predetermined condition regarding the vibration amount indicated with said vibration amount detection signal when performing shooting of a moving image as a determination made by said cancellation condition determining means that a predetermined cancellation condition is satisfied,
   to perform control so as to realize a fourth pattern which causes said first open/close switch, said second open/close switch, said third open/close switch to be turned off, and causes said fourth open/close switch to be turned on, and so as to output the potential of the input terminal of said high-pass filter from a stage later than said high-pass filter with said vibration detecting unit, when said holding means hold said first potential, and
   to perform control so as to realize said third pattern, and so as to output the vibration amount detection signal output from said vibration amount sensor from a stage later than said high-pass filter with said vibration detecting unit.

10. The vibration detecting device according to claim 9, wherein when making transition from a certain pattern to the next pattern between said first pattern, said second pattern, said third pattern, and said fourth pattern, said switch control means perform control temporarily turn off all of said first open/close switch, said second open/close switch, said third open/close switch, and said fourth open/close switch, following which turn on a necessary open/close switch so as to change to the next pattern.

11. An imaging apparatus comprising:
   an imaging unit configured to perform imaging;
   vibration amount detecting means including
      vibration amount sensor means for detecting a vibration amount regarding said imaging unit and outputting a vibration detection signal indicating the detected vibration amount, and
      high-pass filter means for removing DC components superimposed on the vibration amount detection signal;
   shaking correction control means for executing shaking correction control using the vibration detection signal;
   status detecting means for detecting a particular status that changes the vibration amount; and
   input control means for preventing said vibration amount detection signal from being input into said high-pass filter means in response to said particular status being detected by said status detecting means.

12. A vibration detection method for a vibration device, the method comprising:
   detecting, at a vibration amount sensor of the vibration device, a vibration amount;
   outputting, at the vibration amount sensor, a vibration amount detection signal indicating the detected vibration amount;
   controlling, at a high-pass filter of the vibration device, the passage of the high-pass filter by passing said vibration amount detection signal through the high-pass filter to remove DC components to-be superimposed on the vibration amount detection signal;
   detecting, at a status detecting unit of the vibration device, a particular status that changes the vibration amount; and
   controlling, at an input control unit of the vibration device, an input to prevent said vibration amount detection signal from being input into said high-pass filter in response to said particular status being detected by said status detecting unit.

13. A vibration detecting device comprising:
   a vibration amount detecting unit including a vibration amount sensor configured to detect a vibration amount and output a vibration detection signal indicating the detected vibration amount, and a high-pass filter configured to remove DC components superimposed on the vibration detection signal;

a status detecting unit configured to detect a particular status that changes the vibration amount; and an input control unit configured to prevent said vibration amount detection signal from being input into said high-pass filter in response to said particular status being detected by said status detecting unit.

14. An imaging apparatus comprising:

an imaging unit configured to perform imaging;

a vibration amount detecting unit including a vibration amount sensor configured to detect a vibration amount and output a vibration detection signal indicating the detected vibration amount, and a high-pass filter configured to remove DC components superimposed on the vibration detection signal;

a shaking correction control unit configured to execute shaking correction control using the vibration detection signal;

a status detecting unit configured to detect a particular status that changes the vibration amount; and an input control unit configured to prevent said vibration amount detection signal from being input into said high-pass filter in response to said particular status being detected by said status detecting unit.

* * * * *